(12) United States Patent
Campbell et al.

(10) Patent No.: US 7,460,252 B2
(45) Date of Patent: Dec. 2, 2008

(54) GRAPHICAL PRINTING SYSTEM AND METHOD USING TEXT TRIGGERS

(75) Inventors: Terrence J. Campbell, Ithaca, NY (US); John E. Tarbotton, Ithaca, NY (US)

(73) Assignee: Axiohm Transaction Solutions, Inc., Ithaca, NY (US)

( * ) Notice: Subject to any disclaimer, the term of this patent is extended or adjusted under 35 U.S.C. 154(b) by 1076 days.

(21) Appl. No.: 10/756,092

(22) Filed: Jan. 13, 2004

(65) Prior Publication Data

US 2004/0167993 A1 Aug. 26, 2004

Related U.S. Application Data

(60) Provisional application No. 60/439,725, filed on Jan. 13, 2003.

(51) Int. Cl.
G06K 15/00 (2006.01)
G06K 9/46 (2006.01)
(52) U.S. Cl. .................. 358/1.1; 382/190; 358/1.11
(58) Field of Classification Search ............... 712/215; 382/181, 182, 190, 203; 358/1.9, 2.1, 3.23, 358/1.11, 1.1
See application file for complete search history.

(56) References Cited

U.S. PATENT DOCUMENTS

| | | | |
|---|---|---|---|
| 4,027,142 A * | 5/1977 | Paup et al. .................. 235/379 |
| 5,051,924 A * | 9/1991 | Bergeron et al. ............ 704/200 |
| 5,102,244 A * | 4/1992 | Takeda .................. 400/124.07 |
| 5,128,520 A | 7/1992 | Rando et al. |
| 5,305,196 A | 4/1994 | Deaton et al. |
| 5,478,120 A * | 12/1995 | D'Andrea ................... 283/117 |
| 5,740,323 A | 4/1998 | Nomura et al. |
| 5,822,735 A | 10/1998 | De Lapa et al. |
| 5,832,457 A | 11/1998 | O'Brien et al. |
| 5,832,458 A | 11/1998 | Jones |
| 5,859,416 A | 1/1999 | Gatto |
| 5,862,183 A | 1/1999 | Lazaridis et al. |
| 5,940,581 A * | 8/1999 | Lipton ....................... 358/1.11 |
| 6,055,513 A | 4/2000 | Katz et al. |
| 6,092,725 A | 7/2000 | Swartz et al. |
| 6,131,718 A | 10/2000 | Witschorik |
| 6,138,105 A | 10/2000 | Walker et al. |
| 6,251,017 B1 | 6/2001 | Leason et al. |
| 6,321,210 B1 | 11/2001 | O'Brien et al. |
| 6,321,984 B1 | 11/2001 | McCall et al. |
| 6,321,987 B1 | 11/2001 | Watanabe et al. |
| 6,330,544 B1 | 12/2001 | Walker et al. |
| 6,332,126 B1 | 12/2001 | Peirce et al. |
| 6,332,128 B1 | 12/2001 | Nicholson |

(Continued)

*Primary Examiner*—Jerome Grant, II
(74) *Attorney, Agent, or Firm*—George R. McGuire; Bond Schoeneck & King, PLLC

(57) ABSTRACT

A set of new printing functions are implemented as defining commands to make it possible to add graphic effects to a printout of a POS printer. These functions are based on a method of designating usually cyclically re-occurring byte strings, usually text in receipts, to act as triggers to launch the graphics function. These functions include optionally eliminating some text, adding graphic surrounds about designated lines, changing the color of designated lines, and inserting logos between or merging logos with text. Such usage need not make any changes to existing store lane checkout applications. Configuring new custom commands in POS printers permits defining byte string triggers occurring in receipt text that are used to trigger adding graphics to the receipt output.

21 Claims, 19 Drawing Sheets

U.S. PATENT DOCUMENTS

| | | | |
|---|---|---|---|
| 6,351,735 B1 | 2/2002 | Deaton et al. | |
| 6,384,931 B1 * | 5/2002 | Brown et al. | 358/1.18 |
| 6,415,341 B1 | 7/2002 | Fry, Sr. et al. | |
| 6,494,369 B1 | 12/2002 | Kikuchi | |
| 6,510,989 B1 | 1/2003 | Ortega | |
| 6,516,302 B1 | 2/2003 | Deaton et al. | |
| 6,543,683 B2 | 4/2003 | Hoffman | |
| 6,601,036 B1 | 7/2003 | Walker et al. | |
| 6,609,104 B1 | 8/2003 | Deaton et al. | |
| 6,611,811 B1 | 8/2003 | Deaton et al. | |
| 6,648,222 B2 | 11/2003 | McDonald et al. | |
| 7,176,896 B1 * | 2/2007 | Fahraeus et al. | 345/173 |
| 2001/0001203 A1 | 5/2001 | McCall et al. | |
| 2001/0021971 A1 * | 9/2001 | Gibson et al. | 712/215 |
| 2001/0039511 A1 | 11/2001 | Duckworth et al. | |
| 2001/0039512 A1 | 11/2001 | Nicholson | |
| 2001/0042008 A1 | 11/2001 | Hull et al. | |
| 2002/0077892 A1 | 6/2002 | Goring | |
| 2002/0143634 A1 | 10/2002 | Kumar et al. | |
| 2002/0178056 A1 | 11/2002 | Lim | |
| 2002/0178088 A1 | 11/2002 | Lurie et al. | |
| 2002/0188510 A1 | 12/2002 | Arias | |
| 2002/0194069 A1 | 12/2002 | Thakur et al. | |
| 2003/0055727 A1 | 3/2003 | Walker et al. | |
| 2003/0065576 A1 | 4/2003 | Harris et al. | |
| 2003/0101095 A1 | 5/2003 | Suzuki | |
| 2003/0106934 A1 | 6/2003 | McCall et al. | |
| 2003/0149619 A1 | 8/2003 | Stanley et al. | |
| 2003/0154125 A1 | 8/2003 | Mittal et al. | |
| 2003/0177066 A1 | 9/2003 | Zhang et al. | |
| 2003/0195806 A1 | 10/2003 | Willman et al. | |
| 2003/0212595 A1 | 11/2003 | Antonucci | |
| 2003/0220830 A1 | 11/2003 | Myr | |

* cited by examiner

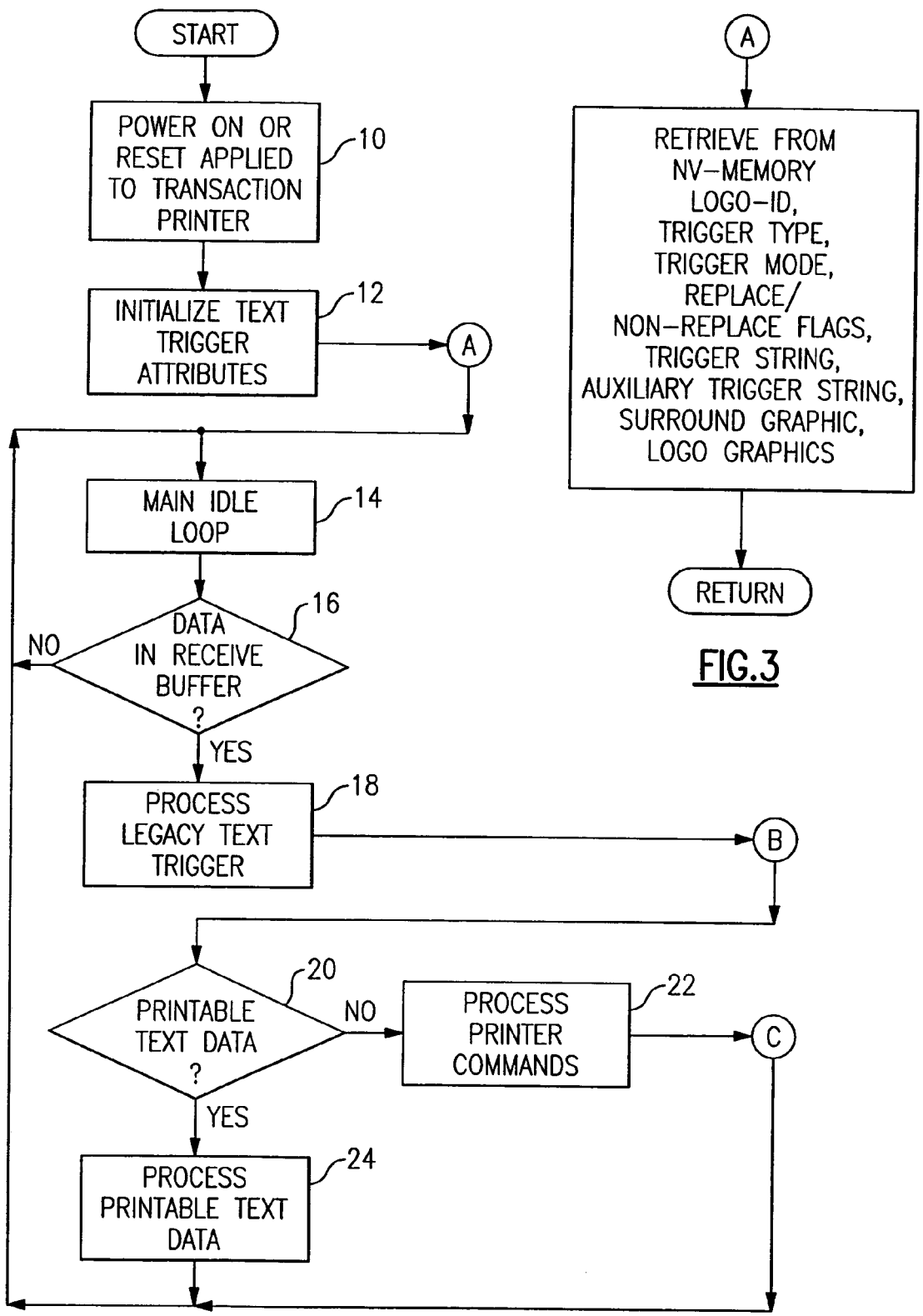

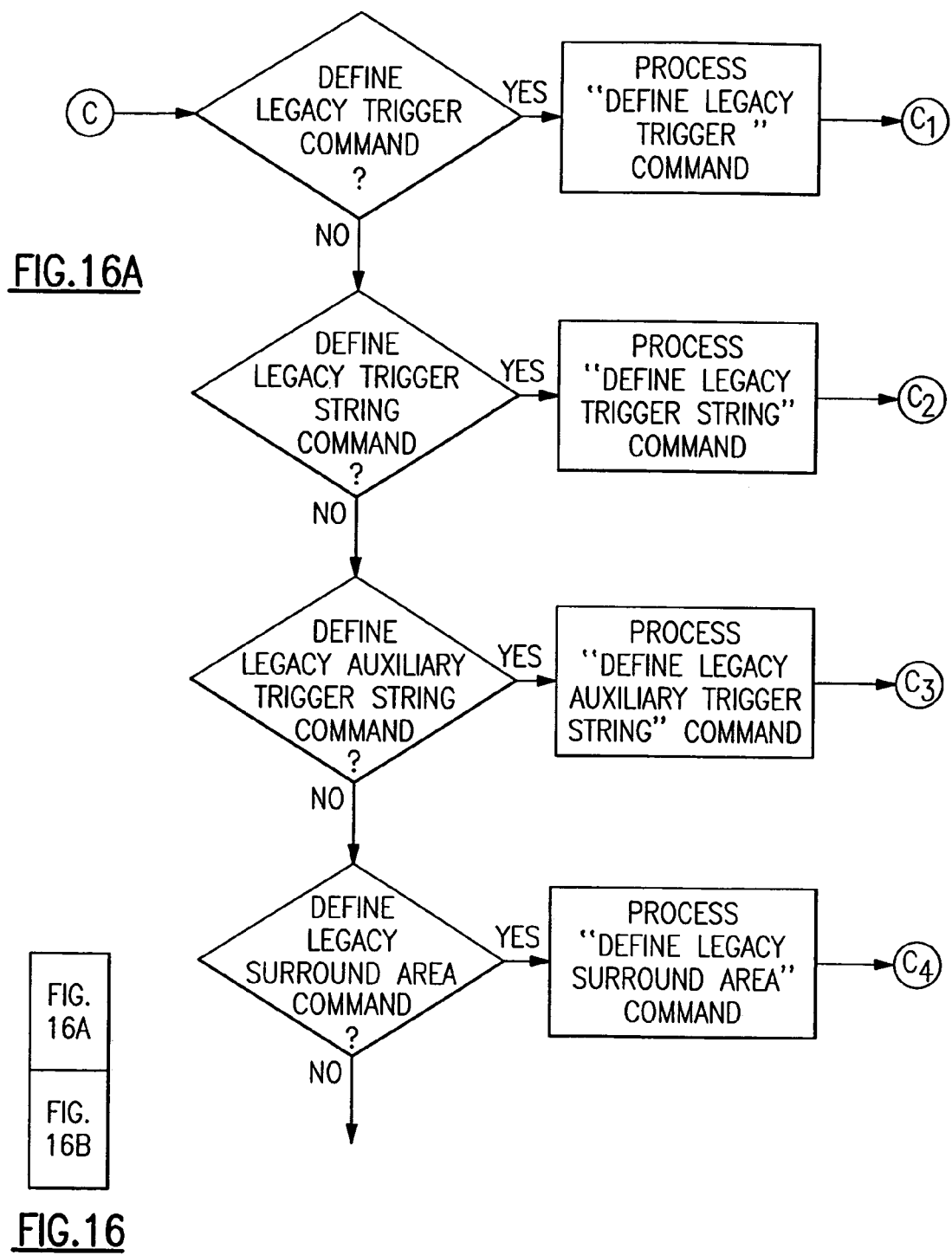

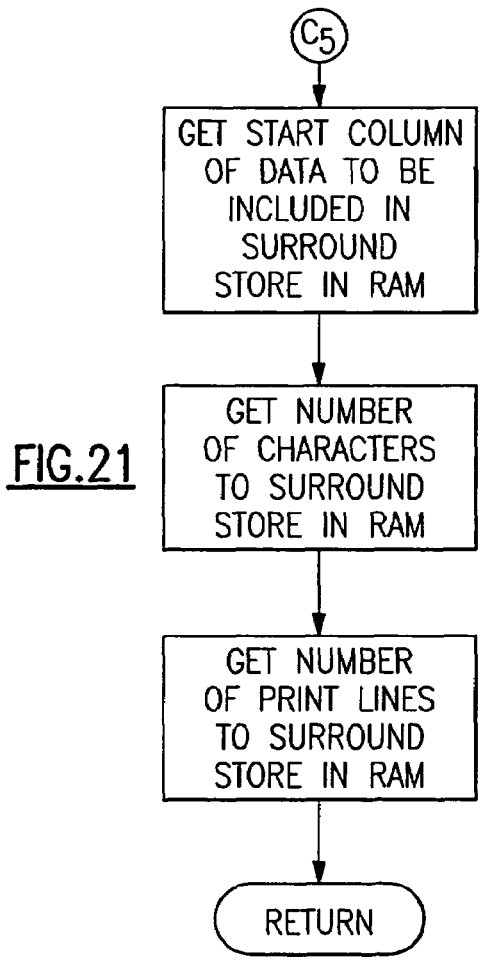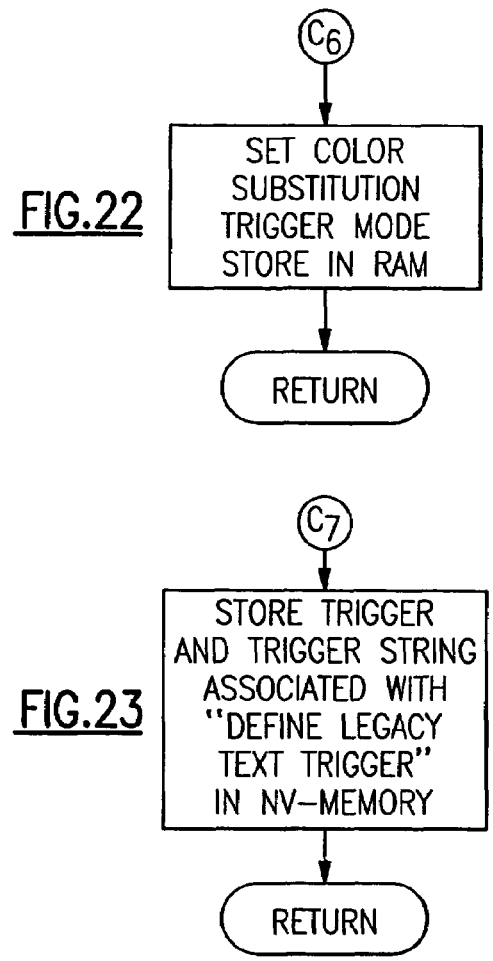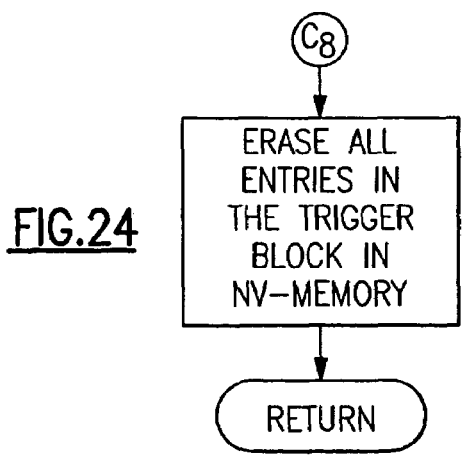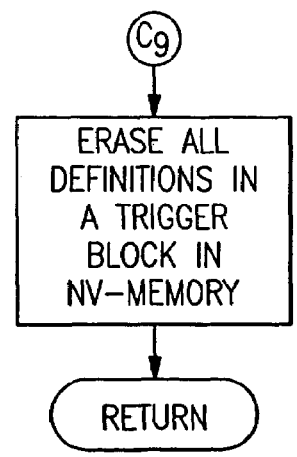

FIG. 26A

```
              a1
        222 CANDY LANE,
        COOKING, NY 12345

JANUARY 15, 2001    9:45AM

ORIG.  YOUR
                      PRICE  PRICE
EGGS X LARGE          1.99   1.29
GALLON ORANGE JUICE   2.45   2.25
12OZ. PKG. COFFEE     3.75   3.45
1LB. GROUND BEEF      3.79   2.99
NORTHERN 12 PK        5.59   4.49
GO-GURT MELON         2.99   2.19
POTATO SALAD          1.95   1.80
CHEESE DEEP DISH      3.95   3.18
KLEENEX COLD CAR      1.45   1.15
OVEN WHITE            3.25   2.79
ENGLISH MUFFIN        2.25   1.98
FF HOT DOG            2.45   2.00

SUB TOTAL      $29.56
        TAX 8%            .45
        TOTAL          $30.01

*A1  SAVINGS  $6.30*

COME TO A1 GROCERY TO SAVE U $
```

FIG. 26B

```
            A1 Grocery

222 CANDY LANE,
        COOKING, NY 12345

JUN2 26, 2001     9:45AM

ORIG.  YOUR
                      PRICE  PRICE
EGGS X LARGE          1.99   1.29
GALLON ORANGE JUICE   2.45   2.25
12OZ. PKG. COFFEE     3.75   3.45
1LB. GROUND BEEF      3.79   2.99
NORTHERN 12 PK        5.59   4.49
GO-GURT MELON         2.99   2.19
POTATO SALAD          1.95   1.80
CHEESE DEEP DISH      3.95   3.18
KLEENEX COLD CAR      1.45   1.15
OVEN WHITE            3.25   2.79
ENGLISH MUFFIN        2.25   1.98
FF HOT DOG            2.45   2.00

SUB TOTAL      $29.56
        TAX 8%            .45
        TOTAL          $30.01

(A1 GROCERY SAVINGS $6.30)

COME TO A1 GROCERY TO SAVE U $
```

GRAPHICAL PRINTING SYSTEM AND METHOD USING TEXT TRIGGERS

CROSS-REFERENCE TO RELATED APPLICATIONS

This application claims priority from U.S. Provisional Application Ser. No. 60/439,725 filed Jan. 13, 2003 and entitled GRAPHICAL PRINTING SYSTEM AND METHOD USING TEXT TRIGGERS, incorporated herein by reference

FIELD OF THE INVENTION

This invention relates generally to the field of point of sale printing systems, and more particularly to a method for adding special effects to a legacy printing application on a point of sale printer.

BACKGROUND OF THE INVENTION

There are a significant number of store PC terminals and Point Of Sale (POS) printers installed today. New features of currently available printers, such as those from Axiohm Transaction Solutions, Inc. ("Axiohm") of Ithaca, N.Y., have made it possible to invoke color and graphics functions to enhance the appearance of receipts. Such functionality of course requires some way to issue the new commands for invoking the color and graphics functions. But in calculating a return on total investment for such enhancements, marketplace reality often dictates doing without such functionality.

In finding a cost effective way to achieve enhanced receipts, there are both mandatory fixed costs and optional costs. The mandatory costs include replacing a POS printer with a new one that features color and graphics functions. Ignoring for the moment the installation and configuration fixed costs which go along with the purchase price, an application upgrade necessary to use the new features is usually a prohibitive expense. Changing out the application, or getting custom modifications done, is the major factor that prevents the enhancement proposition from being viable. But if a solution that can coexist with an unchanged "legacy" retail application were possible, then optional costs would be minimized and the new functionality would become viable. Desired solutions would also allow offsetting these costs by targeting the new printing effects for marketing and advertising purposes.

The principal choice in fixed costs is which printer to purchase. There are at least some candidates, as Axiohm POS printers have offered several graphics commands that can also be set as configuration options. These graphics remain intact across printer power cycles, indicating that they are stored in non-volatile memory. These configurable graphics features can be downloaded and saved prior to installation. If the desired graphic effects are of a static nature, then all that is needed for implementation is a one-time configuration of these graphics at installation time. Very infrequent changes may also be adequately served in such printers by periodically performing off-line reconfiguration and graphics down-loads of different logos into non-volatile memory.

On the other hand, if in addition to the static graphics, which are quite similar to pre-printed receipt paper, the ability to change the appearance of certain items on each receipt is also desired, then new functionality is required. What is needed in the industry is a method that can use the repetitive format of POS receipts and somehow tie selected data to desired effects which uses the new color and graphics capabilities of the printer. The desired outcome is to bridge the visual gap between a legacy receipt and the appearance of a new receipt produced by an application making full use of the graphics command set of POS printers. But in this case, the application producing the receipt is not to be changed, so the problem is how to provide for changeable graphics based on knowledge about a "legacy" application's receipts. An answer to this problem is described in this disclosure.

There are related problems in achieving the goal of inserting graphics into a receipt. One related problem has to do with the art of receipt design, which must be considered when figuring the enhancement total cost, but which is not relevant to the body of this disclosure. What is relevant is that sufficient flexibility in the method is required to realize the above design decisions made about effects that should be achieved, such as, for example, where to insert graphical surrounds of standard receipt text. This flexibility poses a need for maximum flexibility, thus requiring a number of new printer functions rather than one or two canned effects.

Note that the most difficult case of the enhancement problem has been defined with the legacy host application remaining inviolate. If we ease the restriction and modify the application, then some of the invented functions might not be used in particular receipt formats. The approach depends on a trade-off between the cost of each application modification versus the cost to configure the printer. Furthermore, the easiest case is that of an entirely new application that has updated its text printing by using the new color and graphics functions, in which case it may no longer be necessary to use the method functions of the present invention for any of the desired graphics effects. However, the method functions of the present invention can themselves be useful to new applications as well, just as many POS printer additions have been in the past.

If a new application is created for the printer, the entire command set, including color and graphics commands, is available. Hence different POS printer modes can be set, text attributes mapped differently, new logos brought down, and logo roles changed, i.e., which logo will be a header, which will be a watermark, which is used for side margins, and which will be a trailer. Additional application downloaded logos could be printed at the end of a receipt. Enhancements for security can be invoked, for instance, by serializing the margin logo. A new application could even choose to serialize a coupon logo. But even with all these current POS printing features, the mechanized production of the body content of a receipt can be difficult to enhance graphically. Therefore, automatic graphics insertion done by the printer can be useful irrespective of the age of the application.

Another problem that must be addressed is the reluctance of application writers to depend on new functions that are only available on select printers because of the risk of marketability for an application based on only one printer or printer manufacturer line. If an application chooses to use a least common denominator strategy for printer functions, then any new features can be invoked only if they are available as configuration settings. New applications would need to structure their receipts to best take advantage of the configurable features, yet not be dependent on them.

SUMMARY OF THE INVENTION

Briefly stated, a set of new printing functions are implemented as defining commands to make it possible to add graphic effects to a printout of a POS printer. These functions are based on a method of designating usually cyclically re-occurring byte strings, usually text in receipts, to act as triggers to launch the graphics function. These functions include optionally eliminating some text, adding graphic surrounds about designated lines, changing the color of designated lines, and inserting logos between or merging logos with text. Such usage need not make any changes to existing store lane checkout applications. Configuring new custom commands in POS printers permits defining byte string triggers occurring in receipt text that are used to trigger adding graphics to the receipt output.

According to an embodiment of the invention, a method for adding at least one special effect to a legacy printing application on a point of sale (POS) printer includes the steps of (a) identifying at least one predetermined legacy byte string to act as a trigger for adding the at least one special effect to a printed receipt produced by the POS printer; (b) determining when a first string match occurs in an input stream for the POS printer with the at least one predetermined legacy byte string; and (c) adding the at least one special effect to the printed receipt.

According to an embodiment of the invention, an article of manufacture includes a computer usable medium having computer readable program code means embodied therein for adding at least one special effect to a legacy printing application on a point of sale (POS) printer, wherein the computer readable program code means in the article of manufacture includes computer readable program code means for causing a computer to identify at least one predetermined legacy byte string to act as a trigger for adding the at least one special effect to a printed receipt produced by the POS printer; computer readable program code means for causing a computer to determine when a first string match occurs in an input stream for the POS printer with the at least one predetermined legacy byte string; and computer readable program code means for causing a computer to add the at least one special effect to the printed receipt.

BRIEF DESCRIPTION OF THE DRAWINGS

FIG. 2 shows a high level flow chart of an embodiment of the method of the present invention;

FIG. 3 shows an initialization step according to an embodiment of the method of the present invention;

FIGS. 17-25 show details of the steps in the flow chart of FIG. 16;

FIG. 26A shows a store receipt printed under a legacy application; and

FIG. 26B shows the store receipt of FIG. 26A with some enhancements of the present invention applied to the receipt.

DETAILED DESCRIPTION OF THE PREFERRED EMBODIMENT

Figure 1:
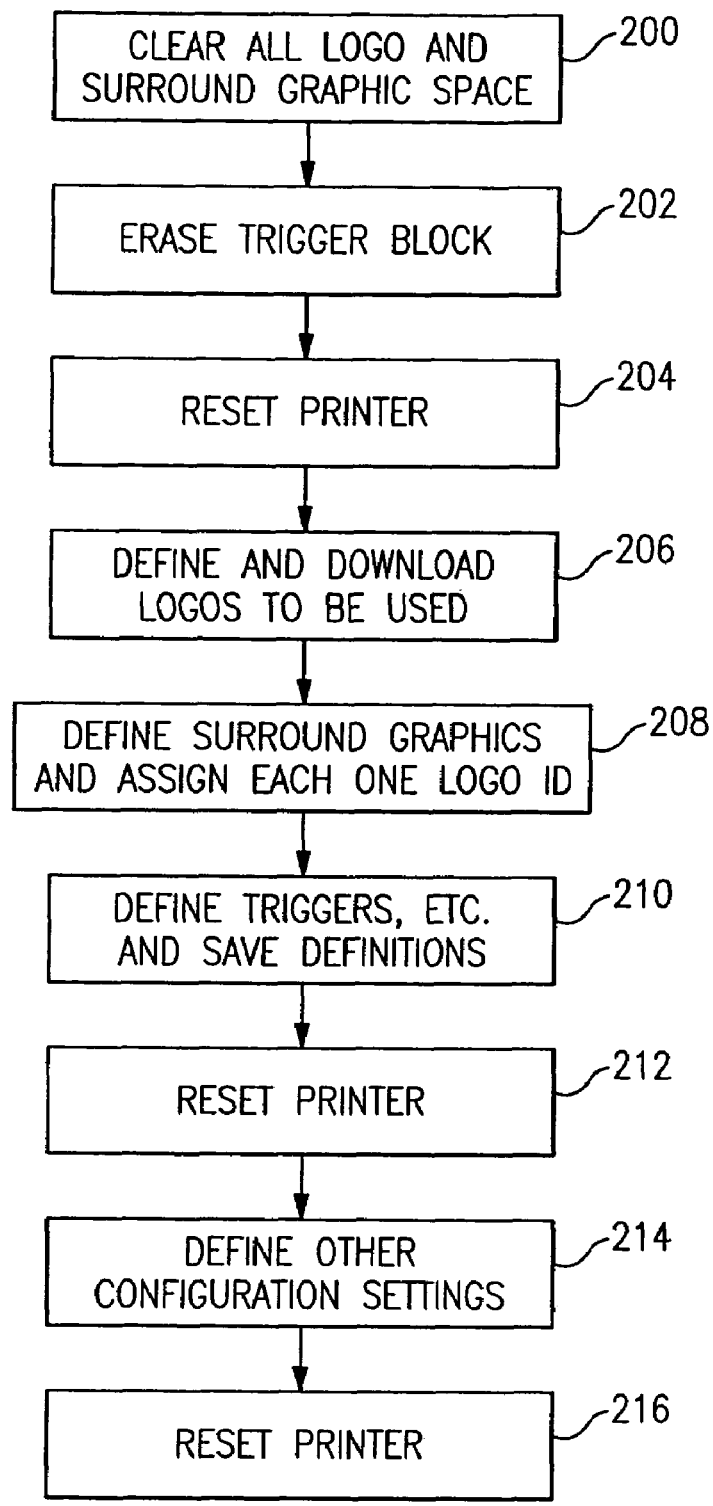
FIG. 1 shows the steps for creating legacy triggers according to an embodiment of the present invention.

The present invention is described for the hardest case of an inviolate host application, since it is not as difficult to determine how the functions can be used to minimize the modifications to an existing application or decrease the development cost of a new application.

The present invention involves the production of special effects, such as graphics and logos, onto the output media of a computer output device. The output media is commonly a receipt dispensed by a point-of-sale printer at a consumer checkout line, but may comprise other types of media, such as coupons, distributed from promotional kiosks or other retail venues. From the printer perspective, the printer receives an input stream consisting of text print data and commands plus command parameters. A legacy application, by definition, will not have sophisticated graphics commands. Legacy application receipts have a basic format and certain text strings that the host application always produces. The present invention contemplates the use of these text strings as trigger points for the addition of the graphical effects.

The invention includes two additions to the conventional POS repertoire of print functions: (1) a string match in the input stream that triggers applying a surround graphic around some legacy text, which method requires a transforming of a surround graphic into a logo suitable for merging, and (2) a string match in the input stream that triggers insertion of a graphic logo.

These additions are described as methods for implementation in POS printer firmware, but may be used in virtually any computer output device which can be programmed accordingly. Note that the equivalent actions can be coded into a host printer driver, which then transforms the printer input stream that the application generates into one that needs only a primitive capability from the printer, i.e., the ability to print a raster dot row. Another option is for the driver to use a less featured printer model and only implement the disclosed functions by using the commands that are available and reverting to raster dot row printing for the effects that cannot be conjured from the commands available in a less featured printer.

In this application, the word "trigger" is used to denote the occurrence of a byte string in the input stream which causes certain actions on the input stream and to the printout. These caused actions are termed "triggered." Because printer commands and print data are mixed in the input stream fed to the printer, a trigger is really a user configured definition of a new command that will be invoked by the byte string. The word "legacy" is used to denote a printer input stream generator from the host application that is not aware of any of a printer's new commands.

Legacy triggers provide the ability to enhance print data and to print logos without the need to change existing applications. Triggers are predefined to look for matching text patterns in the printed receipt and either to enhance the printed data or insert a logo. For instance, the basic format for a store receipt includes the following information: store identifier, date, list of purchased items, sub total, tax, total cost, savings total, and an ending message. A retail application of the invention would provide for the setting of string constants for the items that stay the same from receipt to receipt. These items that stay the same from receipt to receipt then become candidates to be used as triggers. These items are determined for each retail entity or store chain as necessary.

A "logo" is a symbol indicating ownership or source; as used in the POS field, this has been broadened to any graphic ranging from store identifiers to general coupons. A logo is a self-contained shape of picture elements (pixels), which in the 2-color thermal case is formed by each pixel being either off, of primary color, or of secondary color. The term "logo" is not intended to include a "surround," which takes a grid of adjacent text character cells and performs a visual merge (Boolean OR) of a mathematically specified shape into the character cells. Before surrounding, the existing character content is assumed to be mostly blank cells with some character string in the middle, thus giving a printed result of some text surrounded by a graphic shape.

The difference between inserting and merging is that insertion suspends regular printing, performs additional printing of the inserted object using additional paper, and then resumes regular printing. The latter term, merging, is performed by a visual color additive function of both the original print and the merge object just before sending the combined data signal to the print mechanism. This results in an appearance of an original which has been overlaid with the merge object. This object by itself usually has a faint appearance, such as would a logo being designed for use as a watermark.

Referring to FIG. 1, the steps for creating legacy triggers include clearing all logo and surround graphic space, e.g., erasing flash memory (step 200), erasing trigger block (step 202); resetting the printer (step 204); defining and downloading the logos to be used (step 206); defining the surround graphics and assigning each one a logo ID, with each defined surround graphic taking one logo ID space (step 208); defining the triggers, surround data areas, linked graphics ID's, either logo or surround, and saving the definitions as triggered commands (step 210); resetting the printer (step 212); defining other configuration settings, such as logos to be used at the top and bottom of a receipt and as a watermark (step 214); and again resetting the printer, which creates the triggered commands as part of initialization (step 216).

According to an embodiment of the invention, the procedure for defining a standard trigger is:
(a) Define Trigger Mode, Type, Justification, and Color Properties,
(b) Define Trigger String Property,
(c) Define Auxiliary Trigger String Property if required, and
(d) Save the Trigger properties definitions.

The procedure for defining a surround type trigger is:
(a) Define Surround Shape Logo,
(b) Define Legacy Trigger Mode, Type, Justification, and Color Properties,
(c) Define Trigger String Property,
(d) Define Trigger Surround Area Property, and
(e) Save the Trigger properties definitions.

The definition for the surround shape frequently occurs independent of the other steps. The other steps should occur in the order listed.

As can be seen from the above, a number of commands need to be given to the printer to prepare for a complete trigger definition, which is an implementation choice. It is entirely possible to implement the invention so that all trigger properties are set via one multi-parameter command, or at the opposite end of the spectrum, to have individual commands with one parameter for each property. Note that with these configuring commands it is the saving of a trigger definition that sets up the new "triggered" command mechanics, putting all the actions together.

FIGS. 26A-26B show the difference between a legacy receipt 260 (FIG. 26A) and one enhanced by several triggers, receipt 262 (FIG. 26B). The "a1" name of the store in receipt 260, shown at 264, has been replaced in enhanced receipt 262 by a logo 266 for "A1 Grocery." The original prices in receipt 260, shown generally at 268, now have strikethroughs in receipt 262, shown generally at 270. Finally, the text at 272 in receipt 260 has been replaced with a similar string with a freehand ellipse applied as shown at 274 of receipt 262. The legacy text used as triggers are "a1", which is replaced with the A1 logo, "ORIG. PRICE" which triggered the strikethroughs in the column of figures, and "*A1 SAVINGS*" which is replaced with single high and wide boldfaced text with a freehand ellipse surround graphic around it.

The processes and structures germane to the present invention are set forth in and fully explained by the flow charts designated by FIGS. 2-25. Referring to FIG. 2, the process starts in step 10 when either the power is turned on or a reset signal is applied to the transaction printer. The text trigger attributes are initialized in step 12. For example, the logo ID is retrieved from non-volatile memory, as is the trigger type, trigger mode, replace/non-replace flags, trigger string, auxiliary trigger string, surround graphics, and logo graphics as shown in FIG. 3. The main idle loop is shown as step 14. In step 16, the system checks to see if data is in the receive buffer, and if not, control passes to the main idle loop in step 14. If data is in the receive buffer, the legacy text trigger is processed in step 18, with the results passed to step 20 via subroutine B, which is explained in detail below. The system checks in step 20 to see if data was processed during step 18 resulting in printable text data, and if so, the printable text data is processed in step 24, after which system control reverts to the main idle loop in step 14. If no data was processed in step 18, the data in the receive buffer in step 16 must be printer commands, so the printer commands are processed in step 22, after which control reverts to the main idle loop in step 14.

Figure 4:
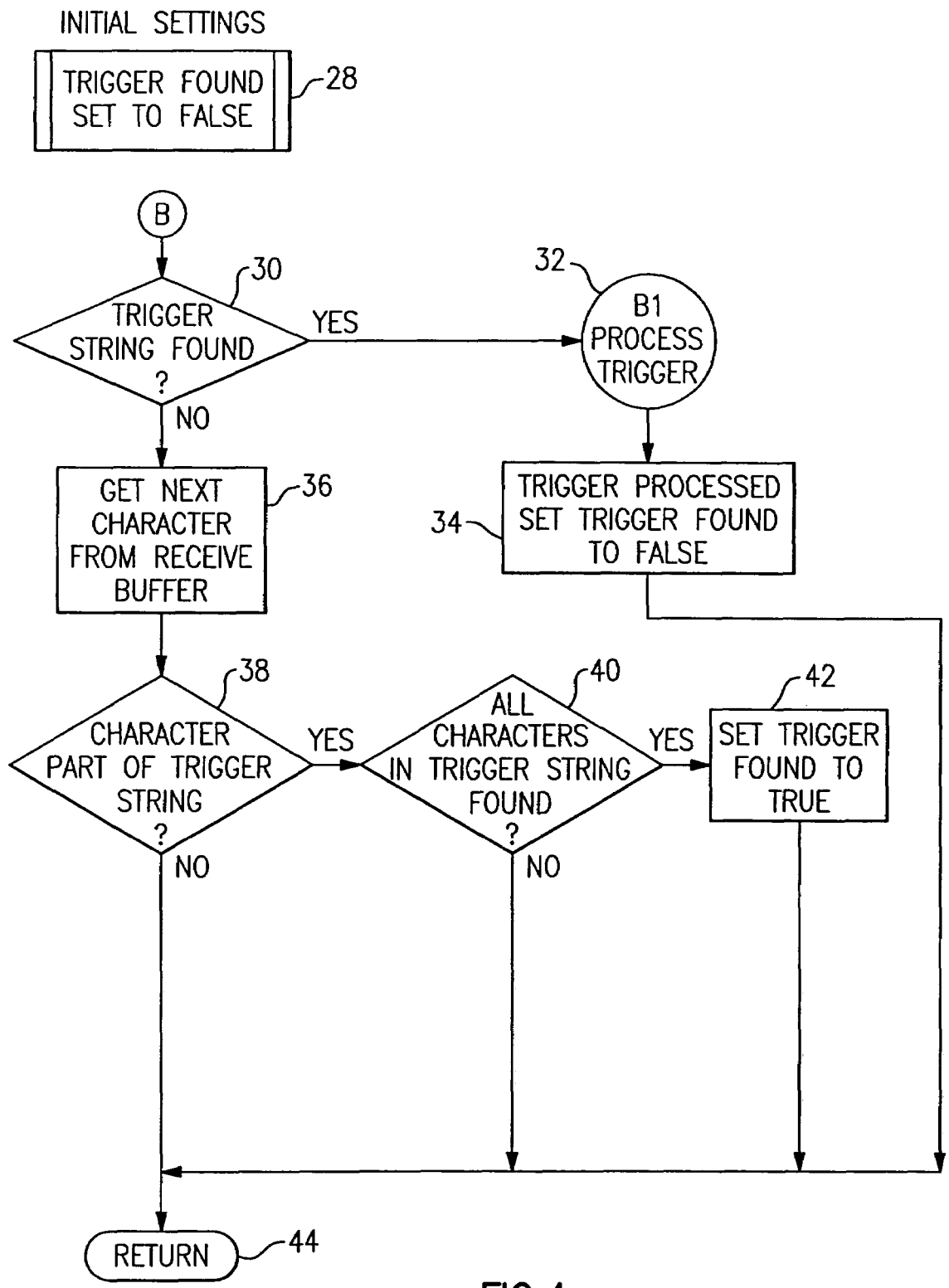
FIG. 4 shows a flow chart for processing a legacy text trigger according to an embodiment of the present invention

Referring to FIG. 4, subroutine B for processing the legacy text trigger (FIG. 2) is explained in more detail. Step 28 shows the initial settings for this subroutine, with the "trigger found" set to False. In step 30, the data in the receive buffer found in step 16 (FIG. 2) is examined. If a trigger string has been found, the trigger is processed in step 32 (subroutine B1), after which the "trigger found" is set to False in step 34 and control is passed back to the main routine in step 44. If no trigger string is found in step 30, the next character is obtained from the receive buffer in step 36. In step 38, the character obtained in step 36 is examined to see if it is part of a trigger string, and if not, control passes back to the main routine in step 44. If it is part of a trigger string, the system checks in step 40 to see if all the characters in the trigger string have been found, and if not, control passes back to the main routine in step 44. Once all the characters in the trigger string are found, the "trigger found" flag is set to True in step 42, after which control passes back to the main routine in step 44.

Figure 5:
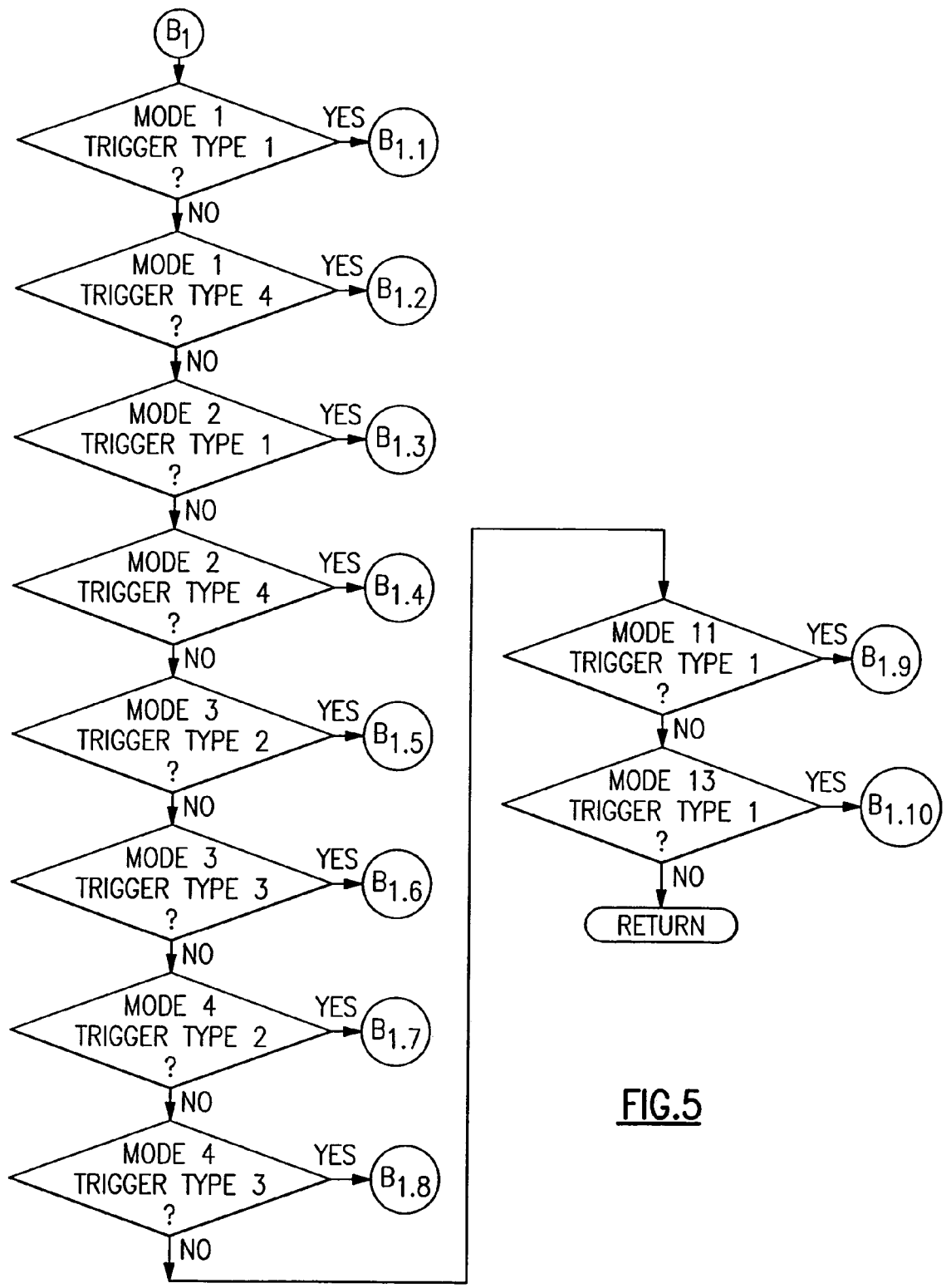
FIG. 5 shows details of a step in the flow chart of FIG. 4.

Referring to FIG. 5, subroutine B1 is shown. In the level of subroutine B1 shown in FIG. 5, the trigger string identified in step 30 (FIG. 4) is checked to see what mode and type the trigger string is. Depending on the mode and type, various lower level subroutines are called by the system. At this point in the description, it is helpful to describe various terms used in the drawings.

Conditional surround graphics are surround graphics that occur only when a certain condition is met. In the present invention, that condition is met when a defined trigger string is received by the POS printer. "Surround graphics" are such figures as ovals, rectangles, circles, squares, and ellipses that surround text to highlight the text. The present invention, in addition to adding surround graphics upon the occurrence of the defined trigger string, permits replacing crude graphics that already exist in a POS application, such as asterisks that draw a box around a portion of the receipt, with one of the above mentioned figures. Conditional surround graphics are handled in the present invention by specifying modes, trigger types, and behavior for the surround operations.

A trigger is the byte string used to initiate insertion of a surround shape or logo graphic into the printout. It must be unique to ensure that the surround isn't inserted at unexpected locations on the receipt, and it should be as short as possible to minimize impact on print speed.

In the defining commands, the word "circle" is used to indicate the text lines in the receipt that remain after the application of a surround graphic, which may result in several lines of text appearing inside the surround graphic.

The format of the expected print data, i.e., the mode, is the key to the definition of a trigger. The other parameters are defined as related to the expected receipt format. As an example, in mode 02, replace means omit the line above and the line below the circled line. In mode 01 it means omit the line above the circled line.

The following modes are preferably defined for use in the POS printer commands.

Mode 01: pre-surround the line(s), surround the line(s). This mode removes the line above the line that contains the conditional surround graphic trigger string. This mode also permits cropping data from either end of the line(s) surrounded, including the line that contains the trigger string.

Mode 02: pre-surround the line(s), surround the line(s), post-surround the line(s). This mode removes the line above the line that contains the conditional surround graphic trigger string, and removes the line(s) that immediately follows the last line that is surrounded. This mode also permits cropping data from either end of the line(s) surrounded, including the line that contains the trigger string.

Mode 03: surround the line(s), post-surround the line(s). This mode removes the line that immediately follows the last line that is surrounded. Other text cannot be cropped in this mode.

Mode 04: surround line(s). The purpose of this mode is not to remove any text via cropping.

Mode 11: inserts a logo that can be left, center, or right justified.

Mode 13: overlays a logo that can be left or right justified.

The following trigger types are preferably defined for use in the POS printer commands.

Trigger type 01: the trigger is on the line above the line(s) to be surrounded. This type applies if the trigger is on the line immediately preceding the line(s) to be surrounded with a graphic. The line with the trigger text is not surrounded. This trigger type is available only with modes that crop a pre-surround line.

Trigger type 02: the trigger is on the first line to be surrounded. This trigger type is available only for modes that do not crop a pre-surround line.

Trigger type 03: the trigger is the character attribute for the surrounded text. The trigger in this case is not a text string, but rather any text with the predefined attributes selected for triggering. This trigger type is only available for modes that do not crop a pre-surround line.

Trigger type 04: the trigger is unable to be specified with only one line. This trigger type therefore depends on an auxiliary trigger string that has to be on the line immediately following the primary trigger string. This trigger type is only available for modes that do not crop a pre-surround line.

Table 1 shows mode and trigger details and examples for conditional surround graphics

TABLE 1

| Mode | Before | Replace Mode | Non-Replace Mode | Valid Trigger Types |
|---|---|---|---|---|
| 1 | text text <br> ********* <br><br> YOU SAVED <br> text text <br><br> text text | text text <br><br><br> (YOU SAVED) <br><br> text text | text text <br> ********* <br><br> (YOU SAVED) <br><br> text text | 1, 4 |
| 2 | text text <br> ********* <br><br> YOU SAVED <br><br> ********* <br> text text | text text <br><br><br> (YOU SAVED) <br><br><br> text text | text text <br> ********* <br><br> (YOU SAVED) <br><br> ********* <br> text text | 1, 4 |
| 3 | text text <br> text text <br> YOU SAVED <br> ********* <br> text text <br><br> text text | text text <br> text text <br> (YOU SAVED) <br><br> text text <br><br> text text | text text <br> text text <br> (YOU SAVED) <br><br> ********* <br> text text <br><br> text text | 2, 3 |
| 4 | text text <br> YOU SAVED <br> text text <br><br> text text | text text <br> (YOU SAVED) <br> text text | text text <br> (YOU SAVED) <br> text text | 2, 3 |

Table 2 shows details and examples for conditional logo graphics.

TABLE 2

| Mode | Before | Replace Mode | Non-Replace Mode | Justification |
|---|---|---|---|---|
| 11 | text one <br> Trigger Code <br> text two <br><br> text two | text one <br> ☆ <br><br> text two | text one <br> Trigger Code <br> ☆ <br> text two | Left Center Right |
| 13 | text one <br> Trigger Code <br><br> text two <br> text three | text one <br> text two <br> ☆ text two <br> text three | text one <br> Trigger Code <br> ☆ text two <br> text three | Left Right |

Figure 6:
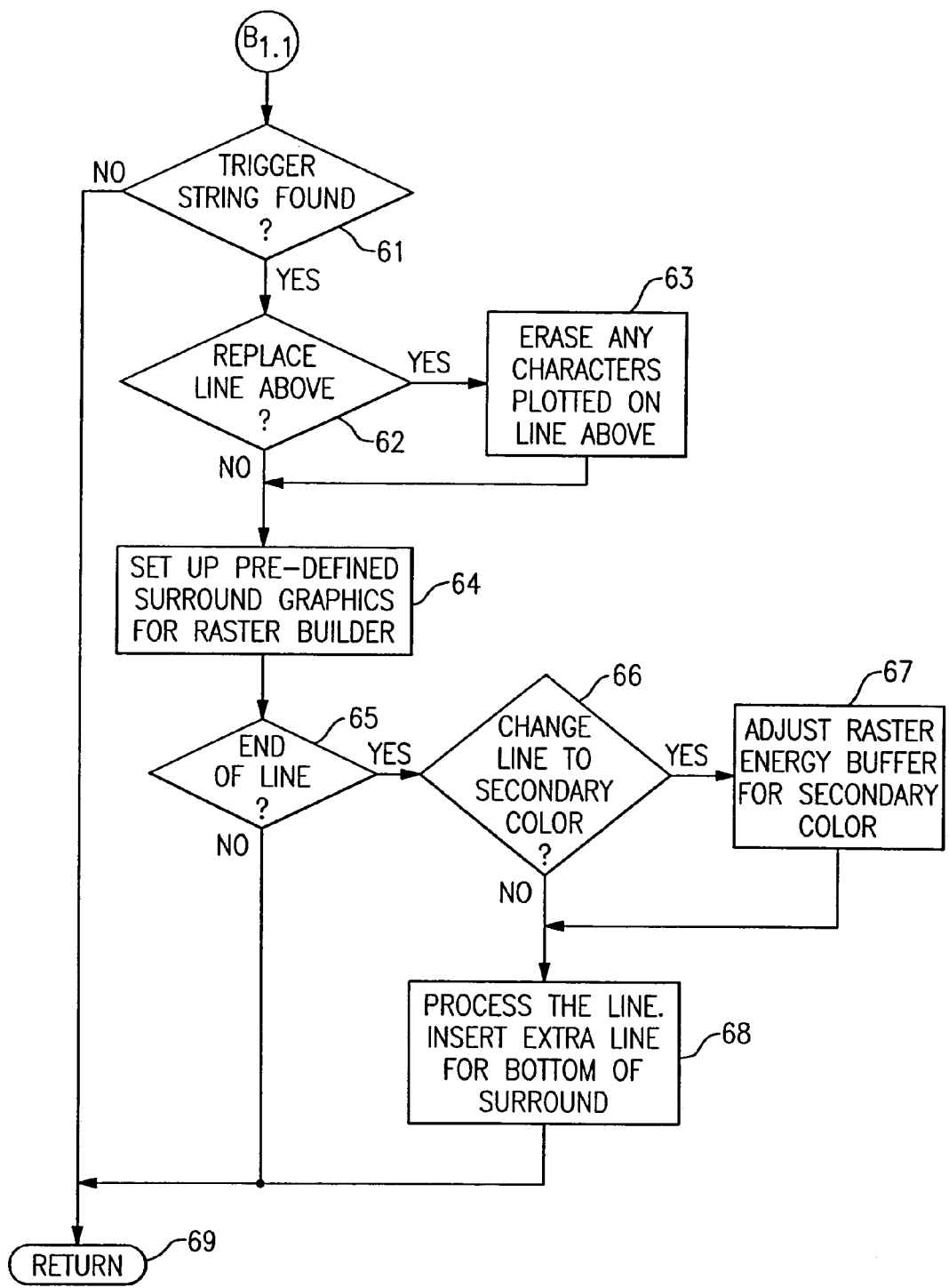
FIGS. 6-15 show details of the steps in the flow chart of FIGS. 5A-5B

Referring once again to the figures, FIG. 6 shows the preferred steps in processing the trigger string when the trigger string is Mode 1, Trigger Type 1. The systems checks to see if the trigger string is found in step 61, after which the system checks in step 62 to see if the line above the trigger string should be replaced. If so, in step 63, any characters plotted on the line above are erased. After step 63, or if the line above the trigger string does not need to be replaced, the predefined surround graphics for the raster builder are set up in step 64. The system checks to see if the end of line condition has been reached in step 65, and if not, control returns to Subroutine B1 (FIG. 5) in step 69. If the end of line condition has been reached, the system checks to see if the line should be changed to the secondary color in step 66. If so, the raster energy buffer for the secondary color is adjusted in step 67; otherwise, the line is processed in step 68 and an extra line is inserted for the bottom of the surround. Control then passes back to Subroutine B1 (FIG. 5) in step 69.

Figure 7:
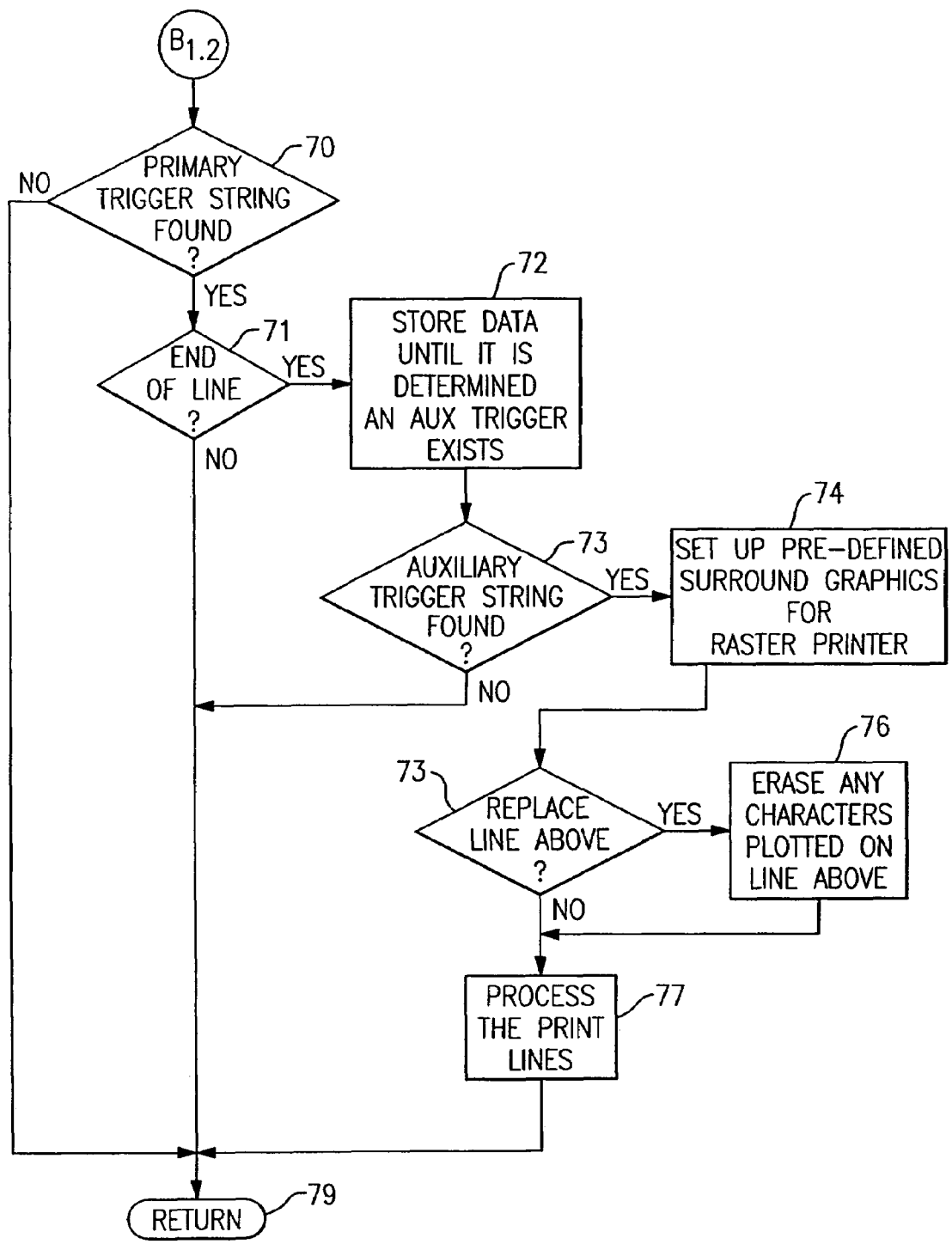

FIG. 7 shows the preferred steps in processing the trigger string when the trigger string is Mode 1, Trigger Type 4. The system checks in step 70 to see if the primary trigger string was found, and if not, control returns to Subroutine B1 (FIG. 5) at step 79. If the primary trigger string was found in step 70, the system checks for an end of line condition in step 71, and until the end of line condition is found, control returns to Subroutine B1 (FIG. 5) at step 79. Once an end of line condition is found in step 71, data is stored in step 72 until it is determined if an auxiliary trigger exists. Then, in step 73, the system checks to see if an auxiliary trigger string is found, and if not, control returns to Subroutine B1 (FIG. 5) at step 79. If the auxiliary trigger string is found in step 73, the predefined surround graphics for the raster printer are set up in step 74, after which the system checks to see if the line above the primary trigger string needs to be replaced, and if so, any characters plotted on the line above the primary trigger string are erased in step 76 before the system moves on to step 77. Otherwise, the print lines are processed in step 77, after which control returns to Subroutine B1 (FIG. 5) at step 79.

Figure 8:
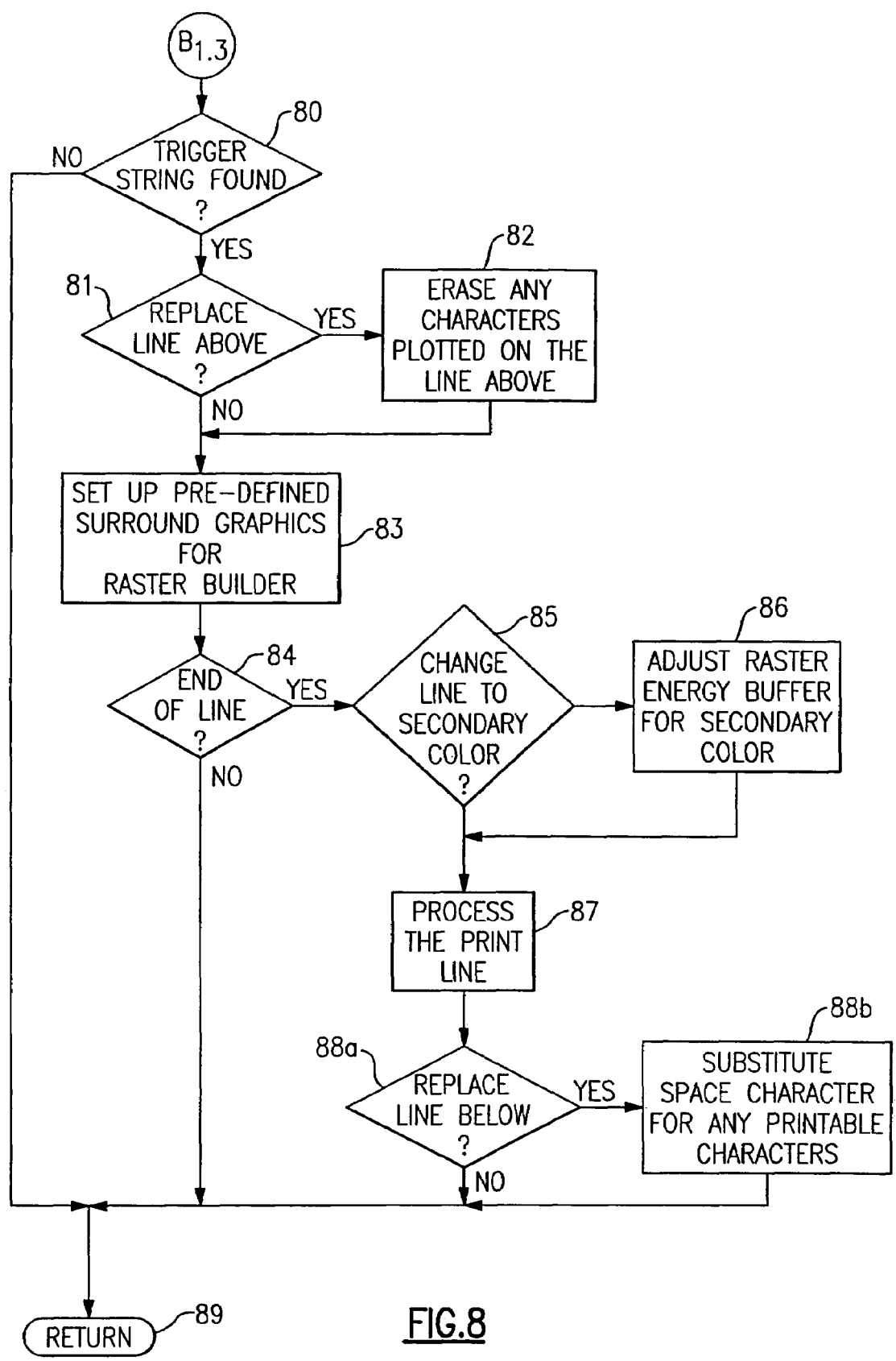

FIG. 8 shows the preferred steps in processing the trigger string when the trigger string is Mode 2, Trigger Type 1. The system checks in step 80 to see if a trigger string was found. If not, control returns to Subroutine B1 (FIG. 5) at step 89. If a trigger string was found in step 80, the system checks in step 81 to see if the line above the trigger string needs to be replaced. If so, any characters plotted on the line above the trigger string are removed in step 82. Then, the predefined surround graphics for the raster builder are set up in step 83, after which the system checks to see if the end of line condition has been reached in step 84. If not, control returns to Subroutine B1 (FIG. 5) at step 89. If the end of line condition has been reached, the system checks to see if the line should be changed to the secondary color in step 85, and if so, the raster energy buffer is adjusted for the secondary color. Otherwise, the print line is processed in step 87, after which the system checks to see if the line below the last line to be surrounded should be replaced in step 88a, and if not, control returns to Subroutine B1 (FIG. 5) at step 89. If the line below the last line to be surrounded should be replaced, space characters are substituted for any printable characters in step 88b.

Figure 9:
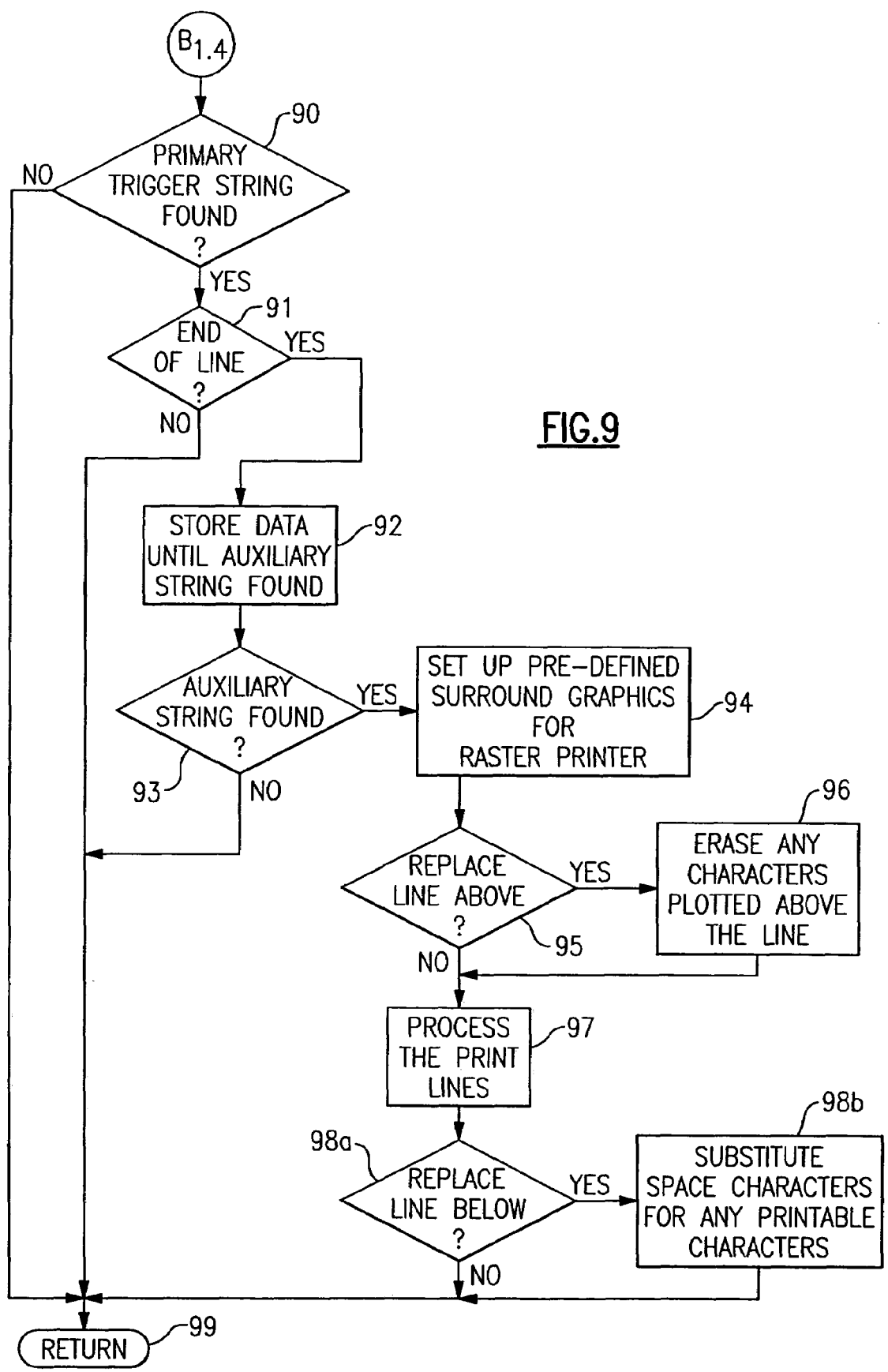

FIG. 9 shows the preferred steps in processing the trigger string when the trigger string is Mode 2, Trigger Type 4. The system checks in step 90 to see if a primary trigger string was found. If not, control returns to Subroutine B1 (FIG. 5) at step 99. If a primary trigger string was found in step 90, the system checks in step 91 to see if an end of line condition exists, and if not, control returns to Subroutine B1 (FIG. 5) at step 99. If the end of the line has been reached, the data is stored in step 92 until an auxiliary trigger string is found. The system checks in step 93 to see if the auxiliary trigger string is found, and if not, control returns to Subroutine B1 (FIG. 5) at step 99. Otherwise, the predefined surround graphics for the raster printer are setup in step 94. The system then checks in step 95 to see if the line above the primary trigger string should be replaced, and if so, any characters plotted for the line above the primary trigger string are erased in step 96. Otherwise, the print lines are processed in step 97. The system checks in step 98a to see if the line below the last line to be surrounded should be replaced, and if not, control returns to Subroutine B1 (FIG. 5) at step 99. If so, space characters are substituted for any printable characters in step 98b, after which control returns to Subroutine B1 (FIG. 5) at step 99.

Figure 10:
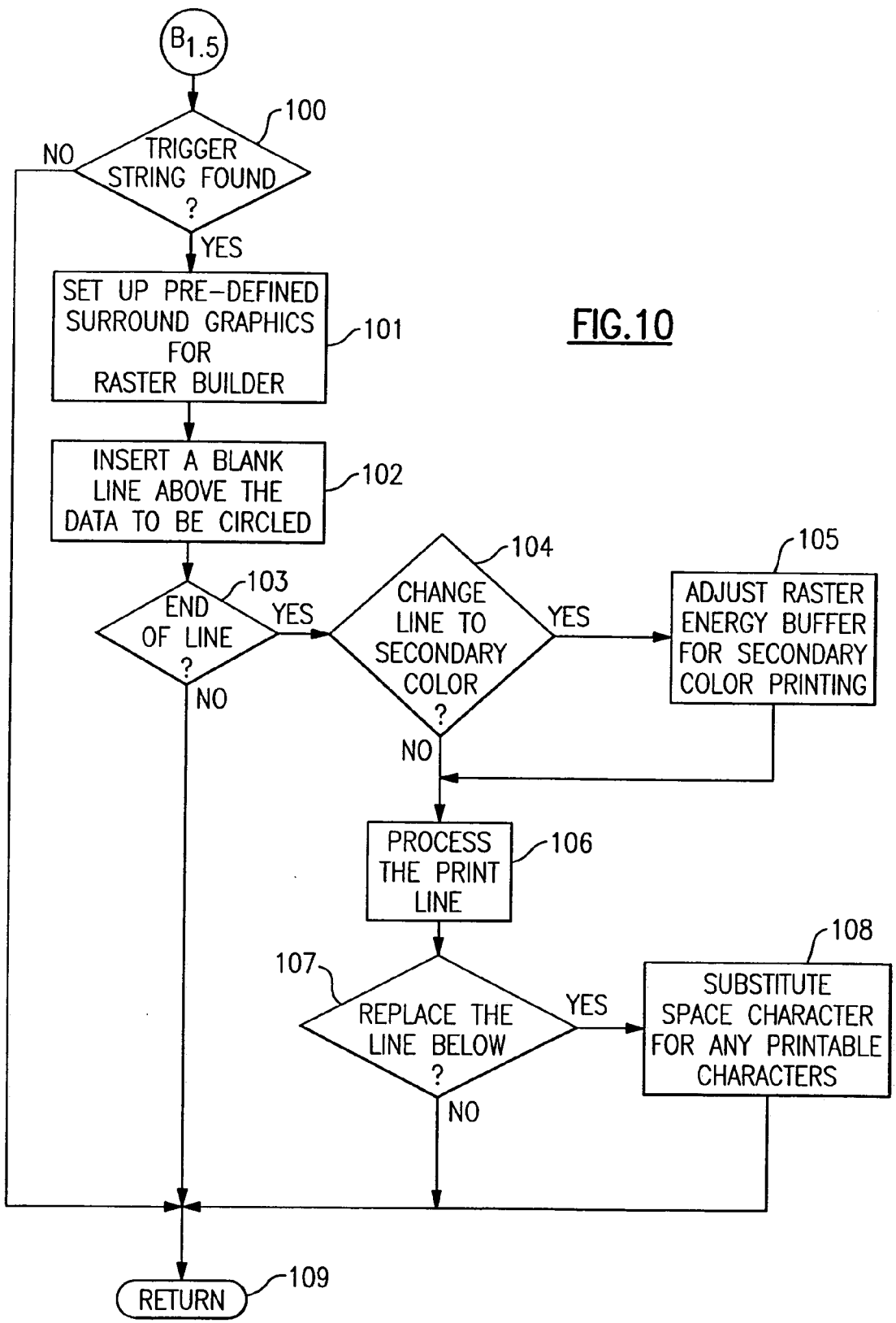

FIG. 10 shows the preferred steps in processing the trigger string when the trigger string is Mode 3, Trigger Type 2. The system checks in step 100 to see if a trigger string was found. If not, control returns to Subroutine B1 (FIG. 5) at step 109. If a trigger string was found in step 100, the predefined surround graphics for the raster builder are set up in step 101. Then, in step 102, a blank line is inserted above the data to be circled. The system checks in step 103 to see if an end of line condition exists, and if not, control returns to Subroutine B1 (FIG. 5) at step 109. Otherwise, the system checks in step 104 to see if the line should be changed to the secondary color, and if so, the raster energy buffer is adjusted in step 105 for secondary color printing. The print line is processed in step 106, after which the system checks in step 107 to see if the line below the last line to be surrounded should be replaced, and if so, space characters are substituted for any printable characters in step 108. Control then returns to Subroutine B1 (FIG. 5) at step 109.

Figure 11:
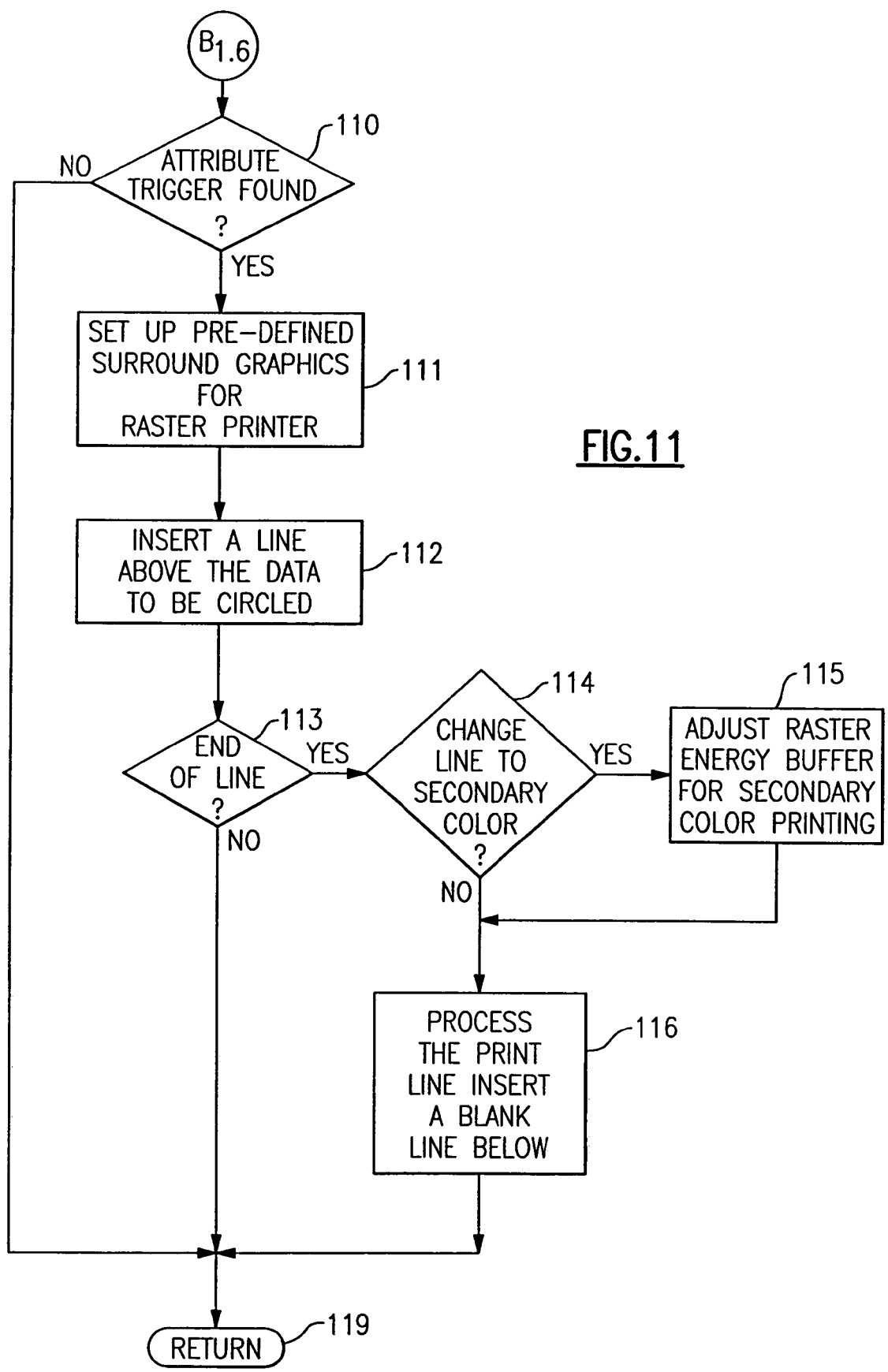

FIG. 11 shows the preferred steps in processing the trigger string when the trigger string is Mode 3, Trigger Type 3. The system checks in step 110 to see if an attribute trigger was found. If not, control returns to Subroutine B1 (FIG. 5) at step 119. If an attribute trigger was found, the predefined surround graphics for the raster printer are set up in step 111. In step 112, a line is inserted above the data to be circled, after which the system checks in step 113 for an end of line condition. If no end of line condition is found, control returns to Subroutine B1 (FIG. 5) at step 119. Otherwise, the system checks in step 114 to see if the line should be changed to the secondary color, and if so, the raster energy buffer is adjusted in step 115 for secondary color printing, after which the print line is processed in step 116 and a blank line is inserted below the print line. Control then returns to Subroutine B1 (FIG. 5) at step 119.

Figure 12:
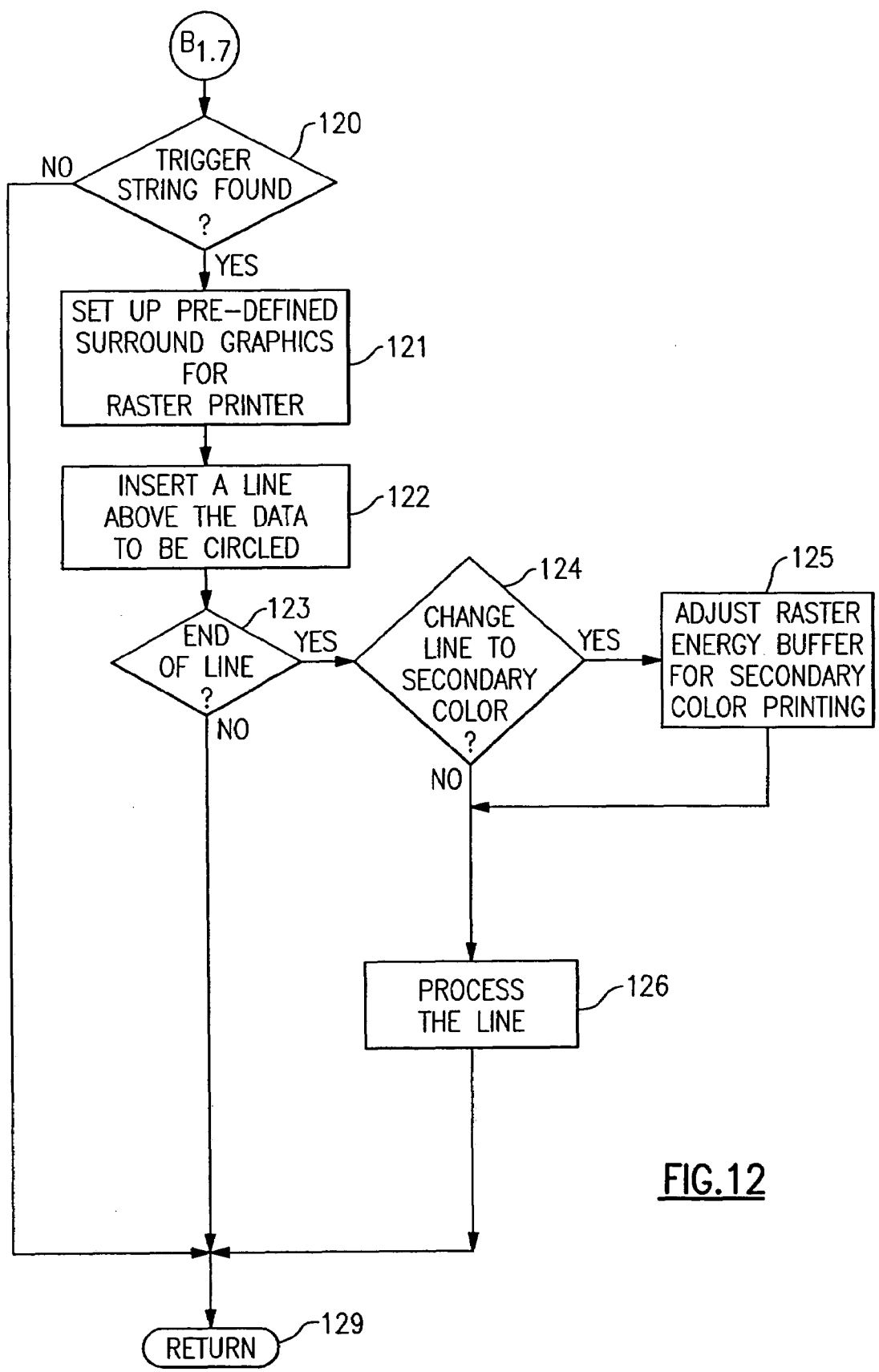

FIG. 12 shows the preferred steps in processing the trigger string when the trigger string is Mode 4, Trigger Type 2. The system checks in step 120 to see if a trigger string was found. If not, control returns to Subroutine B1 (FIG. 5) at step 129. If a trigger string was found in step 120, the predefined surround graphics for the printer raster are set up in step 121. A line is inserted above the data to be circled in step 122, then the system checks in step 123 to see if an end of line condition exists, and if not, control returns to Subroutine B1 (FIG. 5) at step 129. Otherwise, the system checks in step 124 to see if the line should be changed to the secondary color, and if so, the raster energy buffer is adjusted in step 125 for secondary color printing. The line is then processed in step 126, after which control returns to Subroutine B1 (FIG. 5) at step 129.

Figure 13:
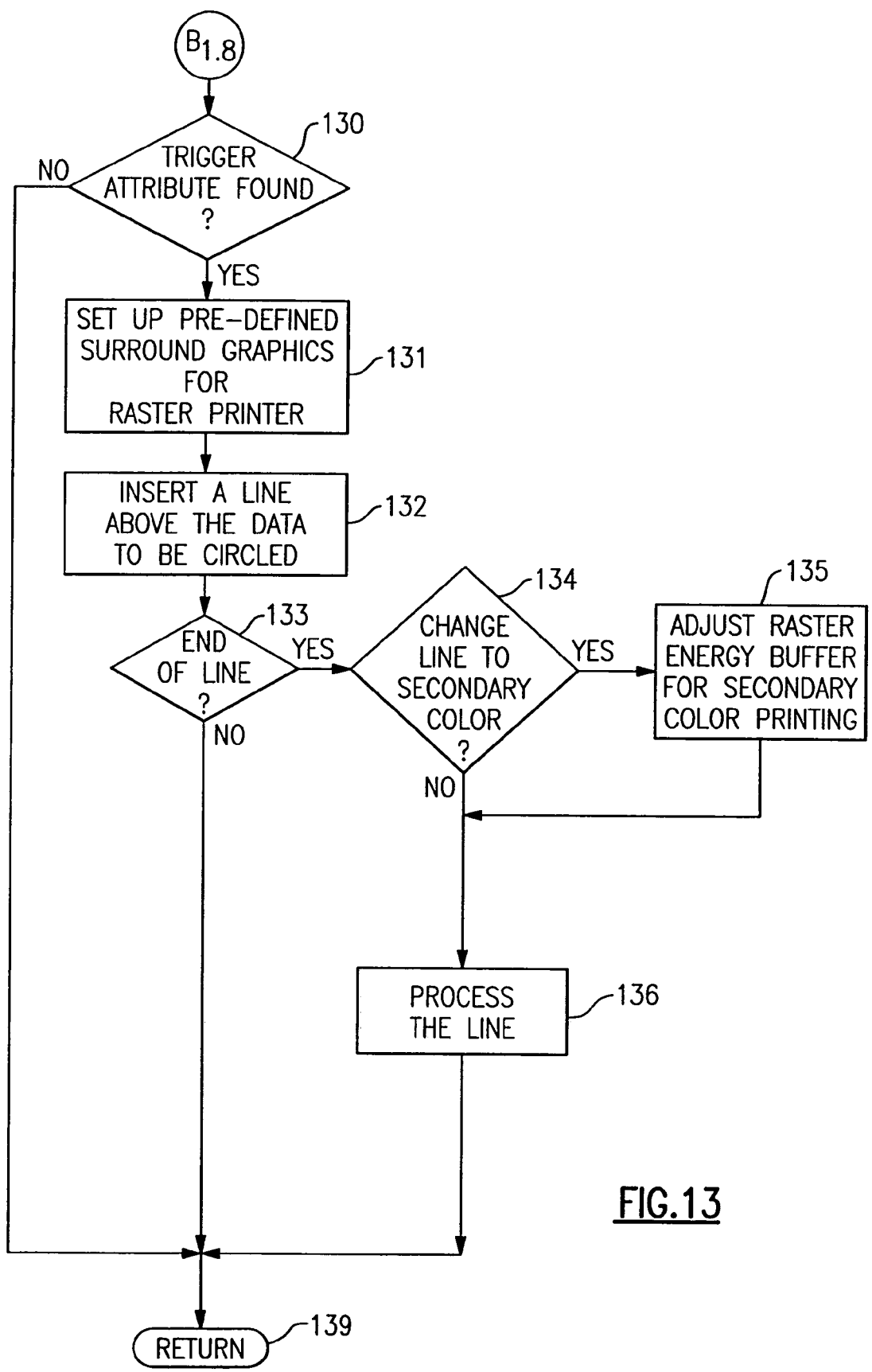

FIG. 13 shows the preferred steps in processing the trigger string when the trigger string is Mode 4, Trigger Type 3. The system checks in step 130 to see if a trigger attribute was found. If not, control returns to Subroutine B1 (FIG. 5) at step 139. If a trigger attribute was found in step 130, the predefined surround graphics are set up for the raster printer in step 131. Then, a line is inserted in step 132 above the data to be circled. The system checks in step 133 to see if an end of line condition is found, and if not, control returns to Subroutine B1 (FIG. 5) at step 139. If so, the system checks in step 134 to see if the line should be changed to the secondary color. If so, the raster energy buffer is adjusted in step 135 for secondary color printing. The line is then processed in step 136, after which control returns to Subroutine B1 (FIG. 5) at step 139.

Figure 14:
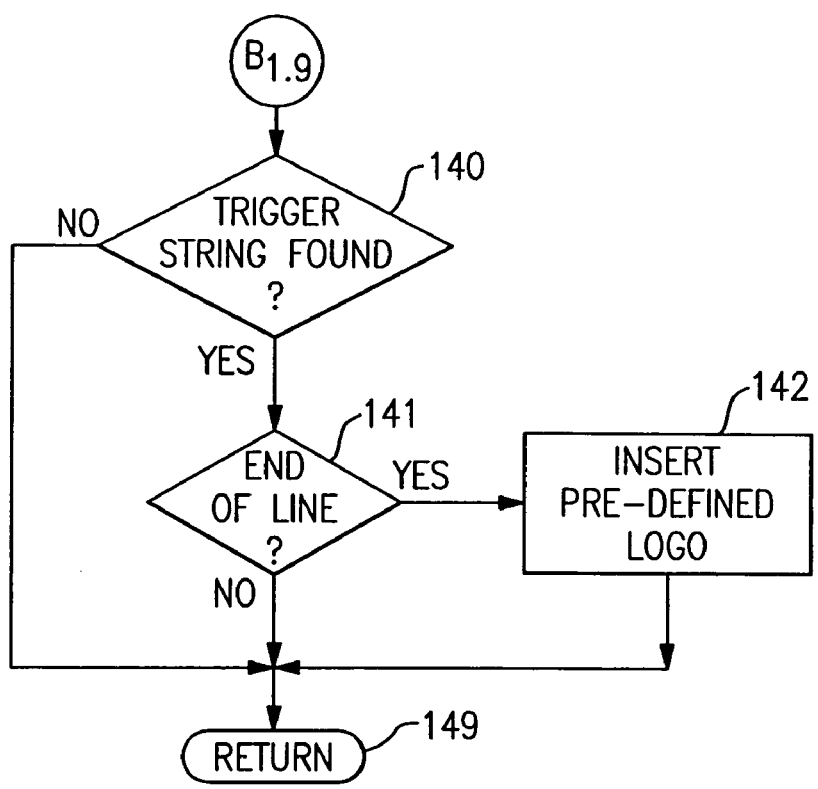

FIG. 14 shows the preferred steps in processing the trigger string when the trigger string is Mode 11, Trigger Type 1. If a trigger string is not found in step 140, control returns to Subroutine B1 (FIG. 5) at step 149. After a trigger string is found, the system checks in step 141 to see if an end of line condition exists. If not, control returns to Subroutine B1 (FIG. 5) at step 149. Otherwise, a predefined logo is inserted in step 142, after which control returns to Subroutine B1 (FIG. 5) at step 149.

Figure 15:
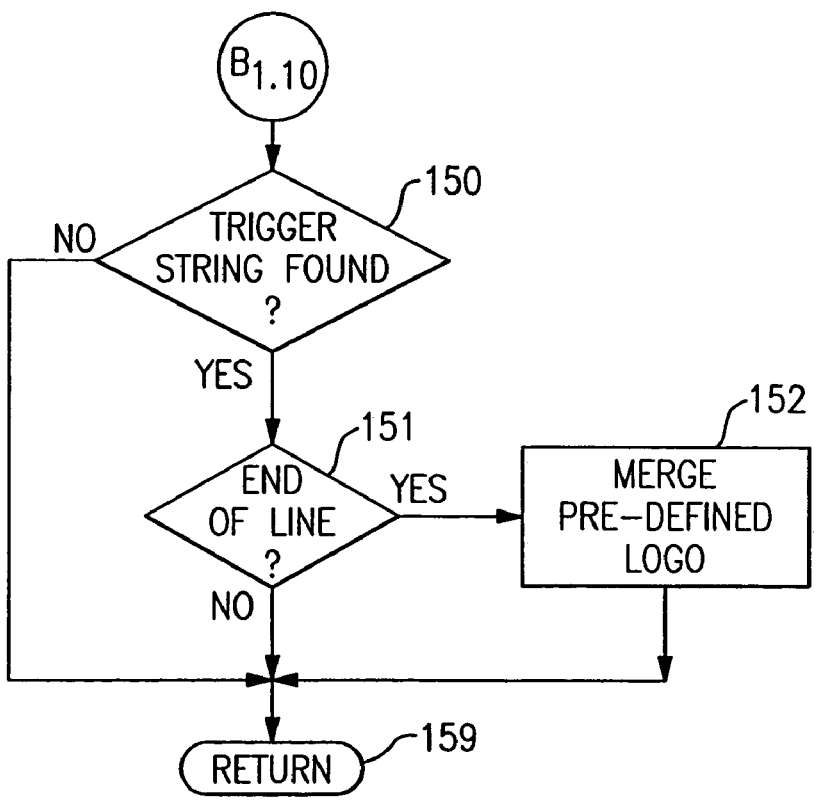

FIG. 15 shows the preferred steps in processing the trigger string when the trigger string is Mode 13, Trigger Type 1. If a trigger string is not found in step 150, control returns to Subroutine B1 (FIG. 5) at step 159. After a trigger string is found, the system checks in step 151 to see if an end of line condition exists. If not, control returns to Subroutine B1 (FIG. 5) at step 159. Otherwise, a predefined logo is merged in step 152, after which control returns to Subroutine B1 (FIG. 5) at step 159.

Figure 16B:
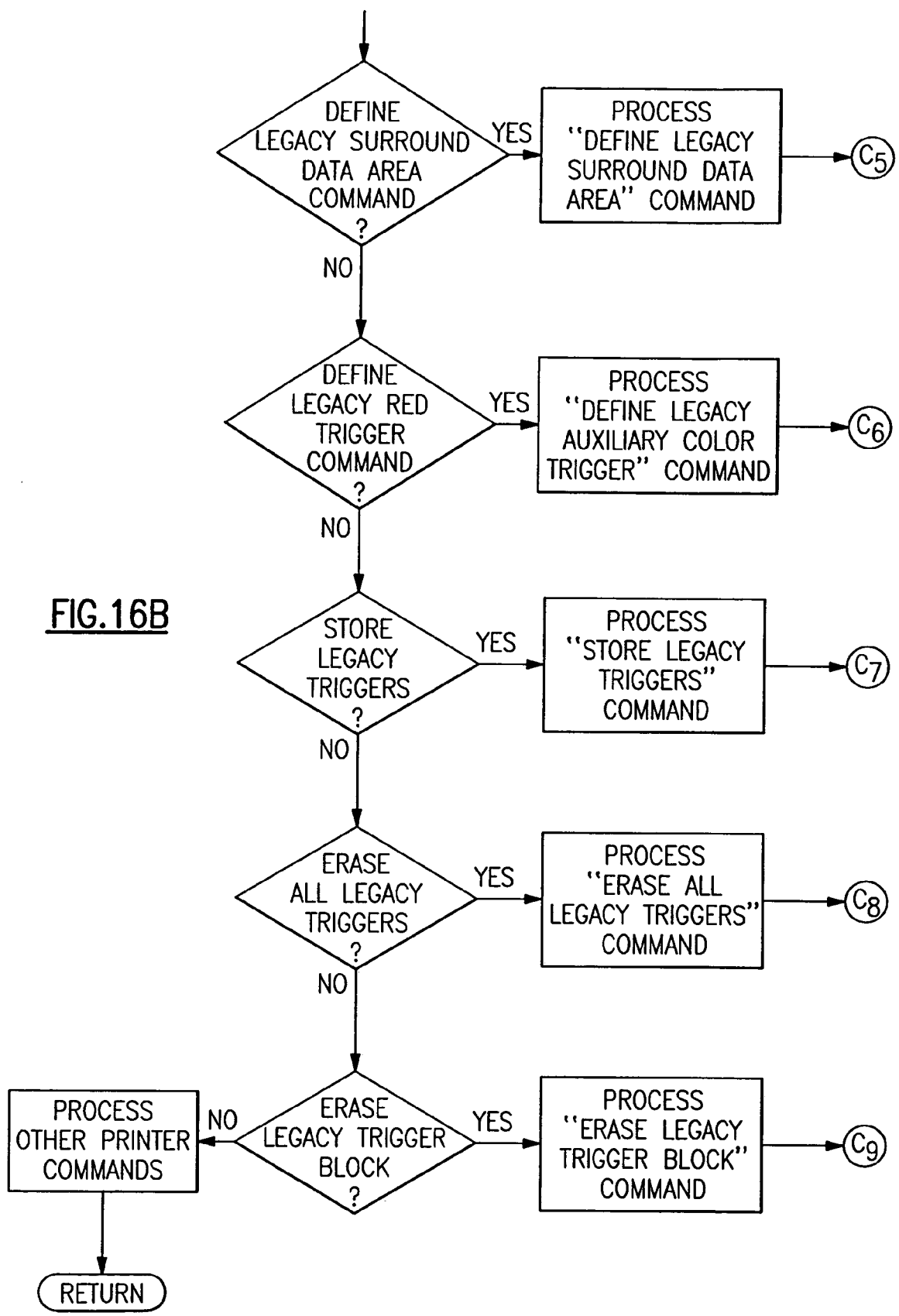
FIG. 16 shows details of a step in the flow chart of FIG. 2.
Figures 17, 18:
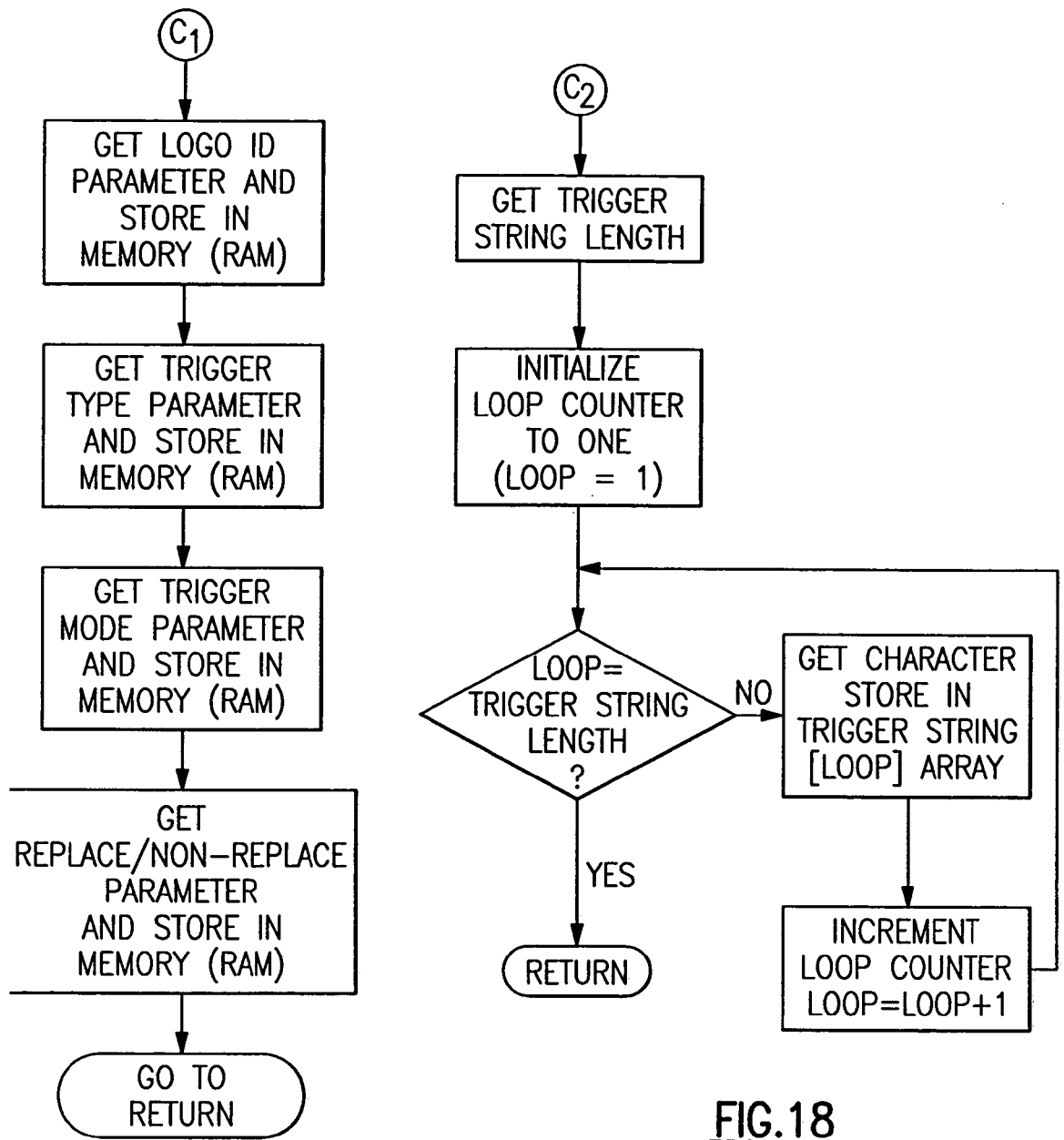
Figure 19:
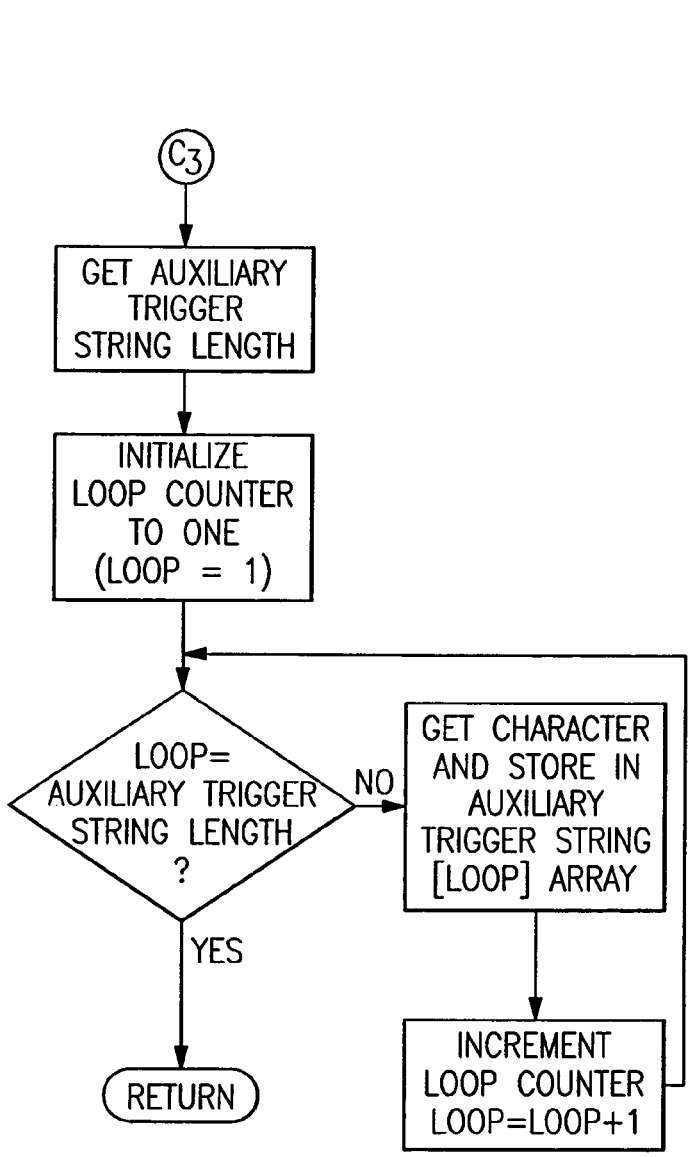
Figure 20:
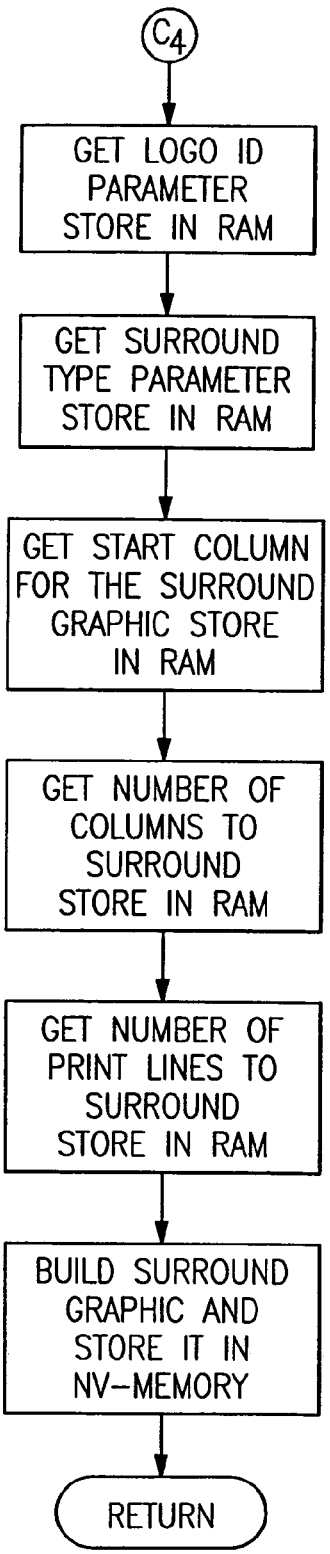

FIG. 16 and associated FIGS. 17-25 show the detailed steps for processing the printer commands from step 22 (FIG. 2) according to an embodiment of the invention.

The following command defines a text trigger, where a trigger is the byte string used to initiate insertion of a surround shape or graphic. It must be unique to ensure that the surround isn't inserted at unexpected locations on the receipt and it should be as short as possible to minimize impact on print speed. The string used by the text trigger must be defined immediately after this command is defined. Up to 256 triggers can be defined. This command defines the major properties of a legacy trigger.

Define Legacy Trigger Properties (FIGS. 16, 17)
ASCII US ETX SYN DLE
Hexadecimal 1F 03 16 10 f t m c r
Values (Hex)
f=00-FF and is the Logo ID
t=01, 02, 03, 04 and is the trigger type. This applies to modes 1-4.
 01. Trigger string is on the line above the line to be circled (recommended method).
 02. Trigger string is on the line containing the data to be circled.
 03. Trigger is a character attribute for all contiguous characters to be circled.
 04. Trigger is a combination of trigger types 1 and 2.
t=01, 02, 03 is the justification which applies to mode 11.
 00. Left
 01. Right
 02. Center
t=01, 03 is the justification which applies to mode 13.
 00. Left
 01. Right
m=01-04, 11, 13 is the mode, which is the format of the printed data before enhancement is applied.
 01. Pre-surround line, surround line(s).
 02. Pre-surround line, surround line(s), post-surround line.
 03. Surround line, post-surround line.
 04. Surround line(s).
 11. Inserts a logo that can be left, center, or right justified.
 13. Overlays a logo that can be left or right justified.
c, r=00-11 are the color and the replacement/non-replacement of the trigger text.
 00. Monochrome, non-replace.
 01. Monochrome, replace.
 10. 2nd Color, non-replace.
 11. 2nd Color, replace.
Related information:
1. Mode defines the meaning of the t parameter. For modes 1-4 (surround modes), t determines the type of trigger to use. For modes 11 and 13, t determines the justification.
2. Modes 11 and 13 always use Trigger Type 1.
3. Mode 13 replaces the margin message function. The two functions can't be used together.
4. Replace. In non-replace mode, the trigger is included with the printed data. In replace mode, the trigger is not included with the printed data. In general, the trigger is not included with the printed data.
5. Mode determines what lines are replaced, i.e., omitted. In mode 1 the line above the surround line is replaced. In mode 2 the line above and the line below the surround line are replaced. In mode 3 the line below the surround line is replaced. In mode 4 no lines are replaced.
6. In non-replace mode 4, the trigger is printed in color if a color property is specified.
7. There is a practical limit to the number of lines that can be surrounded. The limit is a function of the width of the line and the surround type used.
8. Only one surround can be applied at a time. Triggers defined within the surround area are ignored.
9. Nested triggers aren't supported.
10. Triggers that are subsets of other triggers should be avoided.
11. Multiple triggers can use the same logo ID.
12. The printer is busy when writing trigger to flash memory. Delay a minimum of 100 ms after sending this command.
13. Note that the auxiliary trigger string is not replaceable.
14. All text on all lines that contains part of the surround graphic is printed in color if the color bit is set in the (c, r) parameter, not just the trigger string.

The next command defines the text string used by the Define Legacy Trigger Properties command and may immediately follow that command. All commands that need a text trigger property use this command to define the trigger string.

Define Legacy Trigger String (FIGS. 16, 18)
ASCII US ETX SYN DC1
Hexadecimal 1F 03 16 11 n d
Decimal 31 03 22 17
Values (Hex)
n=01-17 Length of the string. 1-23 characters.
d=Text string. Any value but character codes between 20-7F suggested.

The next command defines the auxiliary text string used by modes 1 and 2 of the Define Legacy Trigger Properties command. It should follow the Define Legacy Trigger String command. Note that the auxiliary trigger is not replaced.

Define Legacy Auxiliary Trigger String (FIGS. 16, 19)
ASCII US ETX SYN DC2
Hexadecimal 1F 03 16 12 n d
Decimal 31 03 22 18
Values (Hex)
n=01-17 Length of the string. 1-23 characters.
d=Text string. Character codes between 20-7F.

The next command creates a triggered action command and stores in flash the string information previously set with a Define Legacy Trigger Properties command and others. It should be used after a consistent set of property definitions for a trigger. Flash status (1D 72) can be used to ensure the trigger was successfully saved, else there is either insufficient room or some problem with trigger property values. The printer goes busy while writing to flash memory, so a small delay (100 ms) should be inserted after issuing this command. All legacy trigger properties (even ones not used by current legacy mode and type) are set to null initial values. The next legacy triggered command definition starts with a clean slate, so all property setting must be done.

Store Legacy Trigger (FIGS. 16, 23)
ASCII US ETX SYN DC3
Hexadecimal 1F 03 16 13
Decimal 31 03 22 19

A trigger block containing 256 entries is allocated the first time a trigger command is created. All subsequent trigger definitions use this trigger block as well. There is only one active block at a time. Prior to defining a new trigger, User Status Command (1D 97 06 00) can be used to ensure sufficient entries in the block. If there are not enough entries the block should be erased, so that a subsequent trigger definition command initiates allocation of an empty block. The next command is used to erase all entries in the trigger block.

Erase Legacy Trigger Block (FIGS. 16, 25)
ASCII US ETX SYN DC4
Hexadecimal 1F 03 16 14
Decimal 31 03 22 20

The next command defines a surround type and gives it a Logo ID. When printed, the surround is printed in the active color at the time of definition. To ensure the desired effect, the command should be preceded by a set color command (1B 72 n). The number of print lines to surround should match the parameter in the Define Legacy Surround Data Area Property command, explained next below. It takes time to define the shape and write it to flash memory, so a delay of 1-3 seconds should be inserted after the command.

Define Legacy Surround Area (FIGS. 16, 20)
ASCII US ETX SYN NAK
Hexadecimal 1F 03 16 15 f m n o p
Decimal 31 03 22 21
Values (Hex)
f=00-FF Logo ID.
m=00-05 Surround Type. Surround types include oval, rectangle, circle, and ellipse.
n=00-37 Start column for the surround graphic.
o=01-38 Number of columns to surround.
p=01- . . . Number of print lines to surround.

The next command specifies the text area to enhance with the surround shape. The number of print lines to surround should match the parameter in the Define Legacy Surround Area command, explained immediately above. Text on a line not included in the surround area is either printed or not printed depending on the state of the replace/no-replace flag in the trigger definition. For best results, the data to be surrounded should be centered. The data to be surrounded on a line should have a few blank spaces before and after it to accommodate the shape.

Define Legacy Surround Data Area Property (FIGS. 16, 21)
ASCII US ETX SYN SYN
Hexadecimal 1F 03 16 16 n o p
Decimal 31 03 22 22
Values (Hex)
n=01-38 Start column of the data to be included.
o=01-37 The number of columns+the start column to include in the surround.
p=01- . . . Number of print lines to surround.

The next command causes a complete line to be printed in color. The Define Legacy Trigger String Property command follows this command and defines the line to be printed in the 2nd paper color. For thermal printers, the second color is typically either red or blue, depending on the thermal paper used. Monochrome is black.

Define Legacy 2nd Color Trigger (FIGS. 16, 22)
ASCII US ETX SYN CAN
Hexadecimal 1F 03 16 17
Decimal 31 03 22 23

The next command is used to erase all definitions in a trigger block. Prior to modifying or adding to existing trigger definitions, all defined triggered commands may be erased, after which the new and updated triggered commands can be created. This command is used prior to creating triggers when there would be conflict within active trigger block. If there is not enough space in the block to fit the new triggers, the Erase Legacy Trigger Block command must be used, followed by defining all the triggers. Use the User Status command (1D 97 06 00) to determine if sufficient trigger space is available. If few triggers are defined and they are frequently updated, this is a good command to use because it maximizes use of flash memory and minimizes the need to re-download logos and re-define surround shapes. If many triggers are used and/or they are updated infrequently, the Erase Legacy Trigger Block command should be used because it requires less trigger management.

Erase All Legacy Trigger Commands (FIGS. 16, 24)
ASCII US ETX SYN CAN
Hexadecimal 1F 03 16 18
Decimal 31 03 22 24

The next command enables configuring the functionality of various legacy features. Options specified in the Option Change Mask are set to the value specified in the Option Value Mask. Only options specified in the Option Change Mask are changed; the remaining are untouched.

Set Legacy Feature Options Command
ASCII US ETX SYN BS a m s t
Hexadecimal 1F 03 16 08
Decimal 31 03 22 08
Values:
a=option change mask low byte
m=option change mask high byte
s=option value mask low byte
t=option value mask high byte

| Option | | Value |
|---|---|---|
| Low Byte | | |
| Bit 0 | Side Logos at Top Logo | 0 = no, 1 = yes |
| Bit 1 | Side Logos at Barcodes and Middle Logos | 0 = no, 1 = yes |
| Bit 2 | Side Logos at Bottom Logo | 0 = no, 1 = yes |
| Bit 3 | reserved | reserved |
| Bit 4 | reserved | reserved |
| Bit 5 | reserved | reserved |
| Bit 6 | reserved | reserved |
| Bit 7 | reserved | reserved |
| High Byte | | |
| Bit 0 | reserved | reserved |
| Bit 1 | reserved | reserved |
| Bit 2 | reserved | reserved |
| Bit 3 | reserved | reserved |
| Bit 4 | reserved | reserved |
| Bit 5 | reserved | reserved |
| Bit 6 | reserved | reserved |
| Bit 7 | reserved | reserved |

The next command enables or disables legacy features. The features to enable or disable are specified by setting the appropriate bit in the Feature Mask. Whether the feature should be disabled/enabled is specified by the On/Off Mask. Whether the feature should be disabled/enabled immediately or be delayed until after the next knife cut is specified by setting the appropriate bit in the Delay Mask. This applies to run time only and is not saved in NVRAM.

Enable/Disable Legacy Feature Command (Run Time)
ASCII US ETX SYN ACK a m s
Hexadecimal 1F 03 16 06
Decimal 31 03 22 06
Values:
a=delay mask. Set to 1 delays changing the feature until after the next knife cut.

m=feature mask. Specifies the feature to change. Set to 1 identifies feature to be changed.

s=Setting bit enables the feature, setting to 0 disables the feature.

Bit Masks Bit Definition Table:
Bit 0—Bottom Logo
Bit 1—Top Logo
Bit 2—Ribbon Logo
Bit 3—Watermark
Bit 4—Triggers (Valid for 1F 03 16 06 and 1F 03 16 10 xx xx 30 xx commands only)
Bit 5—Attribute Substitution
Bit 6—Input Substitution The next command enable or disables legacy features. The features to enable or disable are specified by setting the appropriate bit in the Feature Mask. Whether the feature should be disabled/enabled is specified by the On/Off Mask. Whether the feature should be disabled/enabled immediately or be delayed until after the next knife cut is specified by setting the appropriate bit in the Delay Mask. Saved in NVRAM.

Enable/Disable Legacy Feature Command (Permanent)
ASCII US ETX SYN ACK a m s
Hexadecimal 1F 03 16 09
Decimal 31 03 22 09
Values:
a=delay mask. Set to 1 delays changing the feature until after the next knife cut.
m=feature mask. Specifies the feature to change. Set to 1 identifies feature to be changed.
s=Setting bit enables the feature, setting to 0 disables the feature.
Bit Masks Bit Definition Table
Bit 0—Bottom Logo
Bit 1—Top Logo
Bit 2—Ribbon Logo
Bit 3—Watermark
Bit 4—Triggers (Valid for 1F 03 16 06 and 1F 03 16 10 xx xx 30 xx commands only)
Bit 5—Attribute Substitution
Bit 6—Input Substitution The next command creates a trigger to disable a legacy feature for a specified number of knife cuts on matching the specified text in a data stream. The features to suspend are specified by setting the appropriate bit in the Feature Mask. Whether the feature should be suspended immediately or be delayed until after the next knife cut is specified by setting the appropriate bit in the Delay Mask. A trigger must be specified via the 1F 03 16 11 command. This trigger must be stored by the 1F 03 16 13 command.

Suspend Legacy Feature Trigger
ASCII US ETX SYN BS a m 30 s
Hexadecimal 1F 03 16 10
Decimal 31 03 22 16
Values:
a=delay mask. Set to 1 delays suspending the feature until after the next knife cut.
m=feature mask. Set to 1 causes the feature to be suspended.
30H=Suspend function.
s=Remove and count. Specifies the number of knife cuts to suspend feature for. Max=64.
Setting bit 7 of this byte to 1 causes the trigger string to be removed and not printed.
Bit Masks Bit Definition Table
Bit 0—Bottom Logo
Bit 1—Top Logo
Bit 2—Ribbon Logo
Bit 3—Watermark
Bit 4—Triggers (Valid for 1F 03 16 06 and 1F 03 16 10 xx xx 30 xx commands only)
Bit 5—Attribute Substitution
Bit 6—Input Substitution The next command creates a trigger to enable a legacy feature upon matching the specified text in a data stream. The features to enable are specified by setting the appropriate bit in the Feature Mask. Whether the feature should be enabled immediately or be delayed till after the next knife cut is specified by setting the appropriate bit in the Delay Mask. A trigger must be specified via the 1F 03 16 11 command. This trigger must be stored by the 1F 03 16 13 command.

Enable Legacy Feature Trigger
ASCII US ETX SYN BS a m 31 s
Hexadecimal 1F 03 16 10
Decimal 31 03 22 16
Values:
a=delay mask. Set to 1 delays enabling the feature until after the next knife cut.
m=feature mask. Specifies the feature to enable. Set to 1 causes the feature to be enabled.
31H=Enable legacy feature trigger function.
s=Remove. Setting bit 7 of this byte to 1 causes the trigger string to be removed and not printed.
Bit Masks Bit Definition Table
Bit 0—Bottom Logo
Bit 1—Top Logo
Bit 2—Ribbon Logo
Bit 3—Watermark
Bit 4—Not Applicable
Bit 5—Attribute Substitution
Bit 6—Input Substitution The next command creates a trigger to enable a legacy feature upon matching the specified text in a data stream. The features to enable are specified by setting the appropriate bit in the Feature Mask. Whether the feature should be enabled immediately or be delayed till after the next knife cut is specified by setting the appropriate bit in the Delay Mask. A trigger must be specified via the 1F 03 16 11 command. This trigger must be stored by the 1F 03 16 13 command.

Disable Legacy Feature Trigger
ASCII US ETX SYN BS a m 32 s
Hexadecimal 1F 03 16 10
Decimal 31 03 22 16
Values:
a=delay mask. Set to 1 delays disabling the feature until after the next knife cut.
m=feature mask. Specifies the feature to disable. Set to 1 causes the feature to be disabled.
32H=Disable legacy feature trigger function.
s=Remove. Setting bit 7 of this byte to 1 causes the trigger string to be removed and not printed.
Bit Masks Bit Definition Table
Bit 0—Bottom Logo
Bit 1—Top Logo
Bit 2—Ribbon Logo
Bit 3—Watermark
Bit 4—Not Applicable
Bit 5—Attribute Substitution
Bit 6—Input Substitution The Data Stream Substitution Feature is an extension to the trigger command. However, it is not processed with the other triggers. This feature intercepts calls to the communications buffer, tests the data stream and makes substitutions as specified. The trigger commands are used to program the substitution sequences. The data is stored with the triggers and as such takes up trigger locations and is erased by the erase trigger commands. Four of the trigger commands are enhanced for this purpose:

Setup Legacy Trigger (1f 03 16 10). Defines the number of bytes to strip from the data stream.

Set Trigger String (1f 03 16 11). Defines the key to look for in the data stream.

Set Aux Trigger String (1f 03 16 12). Defines the data to insert in the data stream.

Store Legacy Trigger (1f 03 16 13). Saves the trigger and replacement data.

The next command defines the number of bytes to remove from the data stream:

Define Legacy Data Stream Substitution Data to Remove
ASCII US ETX SYN DLE f m
Hexadecimal 1F 03 16 10 0 0 41 1 m
Decimal 31 03 22 16 0 0 65 1
Values (Hex)
f=41 Identifies function as the Data Stream Substitution Trigger Function.
m=Number of bytes of data to strip from the data stream, starting at first character of the trigger.

The next command defines the trigger to look for in the data stream.

Define Legacy Data Stream Substitution Source Trigger
ASCII US ETX SYN DC1 n s
Hexadecimal 1F 03 16 11 n s
Decimal 31 03 22 17
Values (Hex)
n=Number of characters in the trigger.
s=trigger characters: data[0] . . . data[length-1

The next command defines the resultant data stream.
Define Legacy Data Stream Substitution Source Trigger
ASCII US ETX SYN DC1 n s
Hexadecimal 1F 03 16 12 n s
Decimal 31 03 22 18
Values (Hex)
n=number of characters to place in the data stream. Set n=0 to add nothing to the data stream.
s=replacement characters: data[0] . . . data[length-1]

When the strip length is less then the key length the substitution string will be inserted before the remaining key data. CAUTION: Strip lengths of zero cause infinite loops. Use strip length of 1 and put back the stripped character. Commands that download graphics data are excluded from processing, and therefore cannot be included in either the test key or the substitution sequence. These commands include the following:

0x11 Raster Graphics
0x1B 0x2A Set Bit Image Mode
0x1B 0x2E Advanced Raster Graphics
0x1B 0x42 Bmp Graphics
0x1B 0x4B Single Density Graphics
0x1B 0x59 Double Density Graphics
0x1D 0x2A Define Logo
0x1D 0x83 Color Raster Graphics
0x1D 0x84 Download Logo Image The next command sets a specific speed for an operation, allowing the user more control of the print environment. The speed is maintained as long as it is less than the speed automatically set by power management. A parameter of zero (0) restores the normal max speed. The command can be used in two different ways:

(1) If inserted in the receipt data stream, it causes all following text and graphics to be printed at the target speed. It remains in effect until turned off or the printer is reset. Recognition of the command to turn off the target speed occurs prior to the printing of all previous data so the printer returns to normal speed sooner than expected.

(2) If inserted prior to downloading a logo file, the logo file is automatically printed at the target speed. The command is in effect only for the logo downloaded immediately after issuing the command.

Set Temporary Max Target Speed
ASCI GS
Hexadecimal 1D A0 nl nh
Decimal 29
Values:
15H-B4H Monochrome
15H-64H Color
Default: 0. Normal Speed The following diagnostic commands are preferably defined:

Print Trigger Data.
1F 03 16 80 Prints the definition of the active triggers. After the Erase Trigger Block command, 256 triggers should be available.

Print Legacy Settings
1F 03 16 81 Prints the on/off status of all legacy functions.

Print Legacy Substitution (Data Stream) Settings
1F 03 16 82 Prints the on/off status of all legacy substitution settings.

Print Logo Information
1D 9C 00 00 Prints details concerning all active logos. The print count of surround shapes stored as logos is not maintained so the print count should be ignored.

Return Number of Unused Trigger Slots
1D 97 06 00 Returns the number of unused Triggers.

Some of the above functions are complex because they must rely on the print text generated by a client application that is completely unaware of the graphic effects which will be added by the printer. In some cases, control of the print text contents may be too vague and the region for a desired effect does not have any unique and repetitive byte strings. Fortunately, the ability to replace matched text allows configuring very precise actions. When a system implementation has the opportunity to tweak the input data to the printer host application by inserting unique gibberish and/or unprintable characters at the printout place where each effect is desired, then the new functions would be set-up with the parameter option to have the graphic replace the gibberish characters. Such applications are often described as providing "hooks" for their users, e.g., retail stores, to insert custom text into a standard format. It is therefore important that more than just the ASCII text range (20-7F hex) be available for declaration as match strings.

The maximum length of a match string, as given in the above parameter limits, is an arbitrary value, determined by the length of likely trigger words and the prevalent printing media being used. In a POS receipt case, where a maximum line is 40-60 characters, with the upper number arising from printers that offer compressed fonts, a value of 24 generously exceeds all likely usage. This number can be increased or even eliminated with commensurate increases in memory usage and implementation complexity. Both the length of the trigger strings and the total number active at any time influence the performance of the printer.

The following features of the invention are all derived from the ability to trigger off of legacy text:

(a) delaying for a fixed number of bytes the normal processing of input stream bytes;

(b) delaying for a variable number of bytes, which number is determined by the presence of several carriage returns (CR) and or line feed (LF) characters, the processing of input stream bytes;

(c) defining a byte string of less than or equal to maximum length to be stored in non-volatile storage;

(d) managing non-volatile storage for holding up to a fixed number of defined byte strings;

(e) ordering the fixed number of byte strings into fast response memory, e.g., RAM or flash memory, for quickest execution of a match/does not match function;

(f) checking if a subset of the delayed input byte string matches any one of a stored list of strings;

(g) acting on a match occurrence by inserting a defined part of the delayed input string into a stored logo;

(h) acting on a match occurrence by merging a defined part of the delayed input string with a stored logo;

(i) acting on a match occurrence by inserting a defined part of the delayed input string without its matched substring into a stored logo;

(j) acting on a match occurrence by merging a defined part of the delayed input string without its matched substring with a stored logo;

(k) printing the modified logo instead of passing the delayed input string to normal processing;

(l) defining a surround graphic of a certain size, optionally in a specified color, to be a logo;

(m) acting on a match occurrence by inserting a logo into a defined part of the delayed input string (n) acting on a match occurrence by replacing the match string in the delayed input stream with a logo;

(o) acting on a match occurrence by merging a defined part of the delayed input string with a logo;

(p) acting on a match occurrence by eliminating the match string in the delayed input stream and merging the logo with the remainder of the delayed input string;

(q) defining the placement of the above inserted or merged logo to be either left or center or right aligned on the paper;

(r) defining a secondary match string;

(s) storing the secondary match string in non-volatile storage;

(t) associating the secondary match string with a primary match string; and (u) acting on a match occurrence of a first match string and further in the delayed byte string a match occurrence of a secondary match string, where the secondary match is used to detect variable strings that are surrounded by known ones, with the known ones usually being replaced by a surround graphic.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for adding at least one special effect to the output media of a computer output device adapted to receive an input byte stream, said method comprising the steps of:

a) identifying at least one byte string to act as a trigger for adding said at least one special effect to said output media;

b) determining when said at least one byte string occurs in said input byte stream to said computer output device; and c) adding said at least one special effect to said output media in response to said at least one byte string, wherein said step of adding said at least one special effect to said output media comprises:

i) inserting a predefined portion of said input byte stream into a stored graphic for printing;

ii) merging a redefined portion of said input byte stream into a stored graphic for printing;

iii) inserting a graphic into a predefined portion of said input byte stream for printing;

iv) merging a graphic into a predefined portion of said input byte stream for printing;

v) replacing a predefined portion of said input byte stream with a stored logo for printing; or vi) eliminating at least a portion of said predetermined input byte stream and merging a stored graphic with a remainder of said predetermined input byre for printing.

2. A method according to claim 1, wherein said computer output device comprises a point-of-sale printer.

3. A method according to 2, wherein said output media comprises a receipt.

4. A method according to 1, wherein said byte string is a legacy text string.

5. A method according to claim 1, further comprising the step of defining said special effect to be a surround graphic of a predetermined size.

6. A method according to claim 1, further comprising the step of defining said surround graphic to be a predetermined color.

7. A method according to claim 1, further comprising the step of defining said surround graphic to be a predetermined shape.

8. An article of manufacture having computer readable program code means embodied therein for adding at least one special effect to the output media of a computer output device adapted to receive an input byte stream, said article of manufacture comprising:

a) computer readable program code means for storing at least one byte string to act as a trigger for adding said at least one special effect to said output media;

b) computer readable program code means for determining when said at least one byte string occurs in said input byte stream; and c) computer readable program code means for adding said at least one special effect to said output media in response to said at least one byte string, wherein said computer readable program code means for adding said at least one special effect to said output media comprises:

i) computer readable program code means for inserting a predefined portion of said predetermined legacy byte stream into a stored graphic for printing;

ii) computer readable program code means for merging a predefined portion of said predetermined legacy byte stream into a stored graphic for printing;

iii) computer readable program code means for inserting a graphic into a predefined portion of said predetermined input byte stream for printing;

iv) computer readable program code means for merging a graphic into a predefined portion of said predetermined input byte stream for printing;

v) computer readable program code means for replacing a predefined portion of said predetermined input byte stream with a stored graphic for printing; or vi) computer readable program code means for eliminating a predefined portion of said predetermined input byte stream and merging a stored graphic with a remainder of said predetermined input byte stream for printing.

9. An article according to claim 8, further comprising computer readable program code means for defining said graphic to be a surround graphic of a predetermined size.

10. An article according to claim 8, wherein said byte string is a text string.

11. An article according to claim 8, further comprising computer readable program code means for defining said surround graphic to be a predetermined color.

12. An article according to claim 8, further comprising computer readable program code means for defining said surround graphic to be a predetermined shape.

13. A method of adding a surround graphic to legacy data printed on the output media of a computer output device, said method comprising the steps of:
   a) defining a set of surround graphic parameters identifying the type of said surround graphic, the starting column of said output media where said surround graphic will be added, the numbers of columns of said output media that said surround graphic will be surround, and the number print lines said surround graphic will surround;
   b) defining a set of print area parameters identifying the starting column on said output media where said legacy data will be printed, the numbers of columns of said output media where said legacy data will be printed, and the number of print lines of said output media where said legacy data will be printed; and
   c) printing said surround graphic and said legacy data on said output media according to said surround graphic parameters and said print area parameters.

14. A method of adding graphics to the output byte steam of a host application for a computer output device, said method comprising the steps of:
   a) delaying for a predetermined number of bytes the processing of said output byte stream;
   b) defining a plurality of byte strings of less than a predetermined maximum length to be stored in non-volatile storage;
   c) managing said non-volatile storage to hold said byte strings;
   d) ordering said byte strings into a fast response;
   f) determining whether said output byte stream contains at least one matching byte string; and
   g) adding said graphics into said output byte stream in response to determining said matching byte strings are in said output byte stream.

15. The method of claim 14, wherein the step of adding said graphics into said input stream comprises merging said output byte stream with said graphics.

16. The method of claim 14, wherein the step of adding said graphics into said output byte stream comprises inserting predetermined portions of said output byte steam into said graphics.

17. The method of claim 14, wherein the step of adding said graphics into said output byte stream comprises merging predetermined portions of said output byte steam without said matching byte strings with said graphics.

18. The method of claim 14, wherein the step of adding said graphics into said output byte stream comprises inserting at least one logo into a predetermined portion of said output byte stream.

19. The method of claim 14, wherein the step of adding said graphics into a said output byte stream comprises replacing said matching byte strings in said output byte stream with at least one logo.

20. The method of claim 14, wherein the step of adding said graphics into said output byte stream comprises merging a predetermined portion of said output byte stream with at least one logo.

21. The method of claim 14, wherein the step of adding said graphics into a said output byte stream comprises eliminating said match string from said output byte stream and merging at least one logo with said output byte stream.

* * * * *

UNITED STATES PATENT AND TRADEMARK OFFICE
CERTIFICATE OF CORRECTION

PATENT NO. : 7,460,252 B2  
APPLICATION NO. : 10/756092  
DATED : December 2, 2008  
INVENTOR(S) : Terrence J. Campbell and John E. Tarbotton Page 1 of 1

It is certified that error appears in the above-identified patent and that said Letters Patent is hereby corrected as shown below:

Claim 1, line 7, please delete "redefined" and insert --predefined--

Claim 1, line 17, please delete "byre" and insert --byte--

Claim 13, line 24, please delete "be"

Claim 14, line 35, please delete "steam" and insert --stream--

Claim 16, line 17, please delete "steam" and insert --stream--

Claim 17, line 21, please delete "steam" and insert --stream--

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,460,252 B2  
APPLICATION NO. : 10/756092  
DATED : December 2, 2008  
INVENTOR(S) : Terrence J. Campbell and John E. Tarbotton Page 1 of 1

It is certified that error appears in the above-identified patent and that said Letters Patent is hereby corrected as shown below:

Column 20, Claim 1, line 7, please delete "redefined" and insert --predefined--

Column 20, Claim 1, line 17, please delete "byre" and insert --byte--

Column 21, Claim 13, line 24, please delete "be"

Column 21, Claim 14, line 35, please delete "steam" and insert --stream--

Column 22, Claim 16, line 17, please delete "steam" and insert --stream--

Column 22, Claim 17, line 21, please delete "steam" and insert --stream--

This certificate supersedes the Certificate of Correction issued February 10, 2009.

Signed and Sealed this

Tenth Day of March, 2009

JOHN DOLL  
*Acting Director of the United States Patent and Trademark Office*

(12) EX PARTE REEXAMINATION CERTIFICATE (10475th)
United States Patent
Campbell et al.

(10) Number: US 7,460,252 C1
(45) Certificate Issued: Jan. 14, 2015

(54) GRAPHICAL PRINTING SYSTEM AND METHOD USING TEXT TRIGGERS

(75) Inventors: Terrence J. Campbell, Ithaca, NY (US); John E. Tarbotton, Ithaca, NY (US)

(73) Assignee: Pine Street Capital Partners II, LP, Albany, NY (US)

Reexamination Request:
No. 90/012,890, Jun. 12, 2013

Reexamination Certificate for:
Patent No.: 7,460,252
Issued: Dec. 2, 2008
Appl. No.: 10/756,092
Filed: Jan. 13, 2004

Certificate of Correction issued Feb. 10, 2009
Certificate of Correction issued Mar. 10, 2009

Related U.S. Application Data

(60) Provisional application No. 60/439,725, filed on Jan. 13, 2003.

(51) Int. Cl.
*G06K 15/00* (2006.01)
*G06K 9/46* (2006.01)

(52) U.S. Cl.
USPC .......................... 358/1.1; 358/1.11; 382/190

(58) Field of Classification Search
None
See application file for complete search history.

(56) References Cited

To view the complete listing of prior art documents cited during the proceeding for Reexamination Control Number 90/012,890, please refer to the USPTO's public Patent Application Information Retrieval (PAIR) system under the Display References tab.

*Primary Examiner* — Luke S Wassum

(57) ABSTRACT

A set of new printing functions are implemented as defining commands to make it possible to add graphic effects to a printout of a POS printer. These functions are based on a method of designating usually cyclically re-occurring byte strings, usually text in receipts, to act as triggers to launch the graphics function. These functions include optionally eliminating some text, adding graphic surrounds about designated lines, changing the color of designated lines, and inserting logos between or merging logos with text. Such usage need not make any changes to existing store lane checkout applications. Configuring new custom commands in POS printers permits defining byte string triggers occurring in receipt text that are used to trigger adding graphics to the receipt output.

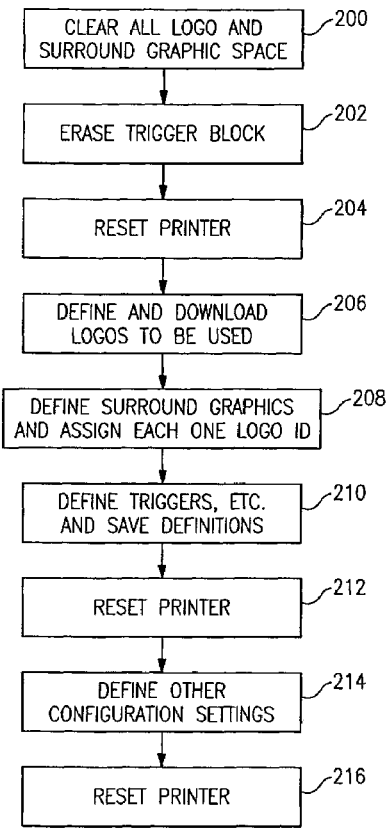

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8-12 is confirmed.

Claim 4 is cancelled.

Claims 1 and 13 are determined to be patentable as amended.

Claims 2, 3 and 5-7, dependent on an amended claim, are determined to be patentable.

Claims 14-21 were not reexamined.

1. A method for adding at least one special effect to the output media of a computer output device, *wherein said computer output device is a printer,* adapted to receive an input byte stream, said method comprising the steps of:
   a) identifying, *by firmware stored on the printer,* at least one byte string to act as a trigger for adding said at least one special effect to said output media, *wherein said at least one byte string is a legacy text string*;
   b) determining, *by said firmware,* when said at least one byte string occurs in said input byte stream to said computer output device;
   c) *printing said legacy text string to said output media when said at least one byte string occurs in said input byte stream to said computer output device* and [c)] *d)* adding, *by said firmware,* said at least one special effect to said output media in response to said at least one byte string, wherein said step of adding said at least one special effect to said output media comprises:
   i) inserting a predefined portion of said input byte stream into a stored graphic for printing;
   ii) merging a [redefined] *predefined* portion of said input byte stream into a stored graphic for printing;
   iii) inserting a graphic into a predefined portion of said input byte stream for printing;
   iv) merging a graphic into a predefined portion of said input byte stream for printing;
   v) replacing a predefined portion of said input byte stream with a stored logo for printing; or
   vi) eliminating at least a portion of said [predetermined] input byte stream and merging a stored graphic with a remainder of said [predetermined] input [byre] *byte* stream for printing.

13. A method of adding a surround graphic to legacy data printed on the output media of a computer output device, *wherein said computer output device is a printer*, said method comprising the steps of:
   [a)] *identifying, by firmware stored on the printer, at least one byte string, wherein said byte string is a legacy text string to be printed on said output media, to act as a trigger for adding said surround graphic to legacy data printed on the output media;* defining a set of surround graphic parameters, *by said firmware,* identifying the type of said surround graphic, the starting column of said output media where said surround graphic will be added, the numbers of columns of said output media that said surround graphic will surround, and the number print lines said surround graphic will surround;
   [b)] defining a set of print area parameters, *by said firmware,* identifying the starting column on said output media where said legacy data will be printed, the numbers of columns of said output media where said legacy data will be printed, and the number of print lines of said output media where said legacy data will be printed; and
   [c)] printing said surround graphic and said legacy data on said output media according to said surround graphic parameters and said print area parameters.

* * * * *